US008467921B2

(12) United States Patent
Smith et al.

(10) Patent No.: US 8,467,921 B2
(45) Date of Patent: Jun. 18, 2013

(54) FLOATING DOCK DEFLECTION MANAGEMENT SYSTEMS

(76) Inventors: David Q. Smith, Vista, CA (US); Alan P. LeVezu, Colfax, CA (US)

( * ) Notice: Subject to any disclaimer, the term of this patent is extended or adjusted under 35 U.S.C. 154(b) by 0 days.

(21) Appl. No.: 13/429,625

(22) Filed: Mar. 26, 2012

(65) Prior Publication Data

US 2012/0174367 A1   Jul. 12, 2012

Related U.S. Application Data

(62) Division of application No. 12/464,055, filed on May 11, 2009, now Pat. No. 8,155,812.

(60) Provisional application No. 61/052,603, filed on May 12, 2008.

(51) Int. Cl.
*B23P 6/00* (2006.01)
*B63C 1/02* (2006.01)
*B63B 43/06* (2006.01)
*B63C 1/06* (2006.01)

(52) U.S. Cl.
USPC ............................................. 701/21; 701/124

(58) Field of Classification Search
USPC .......................................................... 701/21
See application file for complete search history.

(56) References Cited

U.S. PATENT DOCUMENTS

| 4,267,788 A | 5/1981 | Blanco |
| 4,276,849 A * | 7/1981 | Bloxham ..................... 114/125 |
| 4,531,299 A | 7/1985 | Wolfe et al. |
| 4,549,267 A * | 10/1985 | Drabouski, Jr. ............... 701/124 |
| 4,907,524 A | 3/1990 | Hart et al. |
| 5,038,618 A | 8/1991 | Malvern |
| 5,170,567 A * | 12/1992 | Davis et al. ................. 33/366.13 |
| 5,942,750 A | 8/1999 | Sannerhaugen et al. |
| 6,354,152 B1 * | 3/2002 | Herlik ............................ 73/597 |
| 6,745,714 B1 | 6/2004 | Faber |
| 6,761,124 B1 | 7/2004 | Srinivasan |
| 6,834,604 B2 | 12/2004 | O'Neil et al. |
| 7,090,431 B2 | 8/2006 | Cosgrove et al. |
| 2004/0184882 A1 | 9/2004 | Cosgrove |
| 2008/0306642 A1 * | 12/2008 | Figura et al. .................... 701/21 |

FOREIGN PATENT DOCUMENTS

| WO | 9618866 A1 | 6/1996 |
| WO | 2008054047 A1 | 5/2008 |

OTHER PUBLICATIONS

"SFLC Standard Specification 86234, Drydocking." USCG; Surface Forces Logistics Center, United States Coast Guard, Jan. 2009. Web. Nov. 4, 2011.
"IDAC West Drydock System Overview." IDACWest. idacwest.com, Apr. 12, 2001. Web. Nov. 4, 2011.

(Continued)

*Primary Examiner* — Khoi Tran
*Assistant Examiner* — Dale Moyer
(74) *Attorney, Agent, or Firm* — Stoneman Law Patent Group; Martin L. Stoneman

(57) ABSTRACT

This invention relates to a ready system for providing floating dock deflection management systems increasing operations efficiency and providing accurate, safe control to eliminate man-made accidents. This invention also relates to a ready system for providing floating dock deflection management systems providing information to safely operate at least one dry dock without over-stressing the metallurgy of the dry dock.

2 Claims, 17 Drawing Sheets

OTHER PUBLICATIONS

"Dockmaster Training Manual." Hedger Dry Dock, Inc., Heger Dry Dock, Inc., Jul. 3, 2011. Web. Nov. 4, 2011. URL: hegerdrydock.com/dockmaster_training_manual.pdf (file too large to upload to EFS).

"SWM Uses Automation to Speed Workflow." Maritime Reporter. (2000): n. page. Web. Nov. 18, 2011.

* cited by examiner

FLOATING DOCK DEFLECTION MANAGEMENT SYSTEMS

CROSS-REFERENCE TO RELATED APPLICATION

The present application is a divisional of non-provisional utility patent application Ser. No. 12/464,055, filed May 11, 2009, entitled "FLOATING DOCK DEFLECTION MANAGEMENT SYSTEMS" which is related to and claims priority from prior provisional application Ser. No. 61/077,134, filed Jun. 30, 2008, entitled "FLOATING DOCK DEFLECTION MANAGEMENT SYSTEMS", and is related to and claims priority from prior provisional application Ser. No. 61/052,603, filed May 12, 2008, entitled "FLOATING DOCK DEFLECTION MANAGEMENT SYSTEMS", the content of all of which are incorporated herein by this reference and are not admitted to be prior art with respect to the present invention by the mention in this cross-reference section.

BACKGROUND

This invention relates to improved floating dock deflection management systems. More particularly, this invention relates to a ready system for providing floating dock deflection management systems. Further, this invention relates to providing a ready system for floating dock deflection management systems increasing operations efficiency and providing accurate, safe control to eliminate man-made accidents. Additionally, this invention relates to a ready system for providing floating dock deflection management systems providing information to safely operate at least one dry dock without over-stressing the metallurgy of the dry dock.

Presently, floating dock deflection management systems do not comprise, for example, a system for precisely monitoring and controlling longitudinal deflection of at least one length of at least one dry dock, to levels of precision of the order of micro-radians. Also, presently, floating dock deflection management systems do not comprise, for example, a system for precisely monitoring and controlling transverse deflection of at least one length of at least one dry dock, to levels of precision of the order of micro-radians. Additionally, presently, floating dock deflection management systems do not comprise, for example, a system for precisely monitoring and controlling transverse longitudinal deflection or skew of at least one length of at least one dry dock, to levels of precision of the order of micro-radians Thus, a need exists for a ready floating dock deflection management system that comprises, for example, monitoring and controlling longitudinal deflection, and/or monitoring and controlling transverse deflection, and/or monitoring and controlling transverse longitudinal deflection and/or skew of at least one length of at least one dry dock, to levels of precision of the order of micro-radians.

OBJECTS AND FEATURES OF THE INVENTION

A primary object and feature of the present invention is to provide floating dock deflection management systems that comprise monitoring and controlling longitudinal deflection of at least one length of at least one dry dock.

It is a further object and feature of the present invention to provide ready floating dock deflection management systems that comprise monitoring and controlling transverse deflection of at least one length of at least one dry dock, to levels of precision of the order of micro-radians It is a further object and feature of the present invention to provide ready floating dock deflection management systems that comprise monitoring and controlling transverse longitudinal deflection or skew of at least one length of at least one dry dock, to levels of precision of the order of micro-radians Also, a further primary object and feature of the present invention is to provide such a system that is efficient, inexpensive, and handy. Other objects and features of this invention will become apparent with reference to the following descriptions.

SUMMARY OF THE INVENTION

In accordance with a preferred embodiment hereof, this invention provides an apparatus, relating to controlling deflections of materials of at least one large, dynamically-supported, elongated floatable structure having a plurality of dynamic support points, comprising: at least one first set of sensors associated with such materials and respectively spaced at respective sensor locations along at least one first length of such materials substantially parallel to at least one longitudinal axis of such structure; and at least one controller structured and arranged to take dynamic support action responsive to outputs of such at least one first set of sensors; wherein each respective sensor of such at least one first set of sensors is essentially adapted to measure respective relative inclination at a respective sensor location along such at least one first length of such materials; wherein each such sensor essentially provides information in relation to relative inclinations in respective portions of such structure to such at least one controller; wherein such dynamic support action taken by such at least one controller comprises minimizing of such relative inclinations; and wherein deflections in such materials of such respective portions may be controlled; and at least one action system structured and arranged to perform such dynamic support action.

Moreover, it provides such a apparatus wherein: such at least one first length comprises at least one first sub-length and at least one second sub-length, each one oriented substantially parallel to the at least one longitudinal axis of such structure; such at least one first set of sensors comprises at least one first plurality of sensors and at least one second plurality of sensors; such at least one first plurality of sensors is associated with such materials and are spaced at respective sensor locations along such at least one first sub-length; and such at least one second plurality of sensors is associated with such materials and are spaced at respective sensor locations along such at least one second sub-length. Additionally, it provides such a apparatus further comprising: at least one position sensor located midships of such elongated floatable structure; wherein such at least one position sensor essentially provides at least one reference indicating position of such elongated floatable structure with respect to at least one horizon; and wherein such at least one action system, responsive to such at least one controller, essentially assists such structure to seek to remain in essentially a horizontal plane.

Also, it provides such an apparatus wherein: such at least one controller comprises at least one computer processor structured and arranged to respond to deflection information of such sensors and control such action system to minimize any deflections. In addition, it provides such a apparatus wherein: such at least one action system further comprises at least one pumping-system interface structured and arranged to interface with at least one ballast pumping system of such elongated floatable structure; wherein such at least one ballast pumping system interface assists pumping at least one flowable ballast substance; and such at least one pumping-system interface is further structured and arranged to respond to such at least one controller. And, it provides such a apparatus wherein: such at least one action system further comprises at least one plurality of ballast-tank sensors structured and arranged to respectively measure the flowable ballast substance contained within a plurality of ballast tanks of such elongated floatable structure; and such at least one pumping-system interface is structured and arranged to assist move such flowable ballast substance in and out of selected ballast tanks among such at least one plurality of ballast tanks in accordance with control of such at least one controller. Further, it provides such a apparatus wherein: such at least one action system further comprises at least one ballast-valving interface structured and arranged to interface with at least one ballast-valving system of such elongated floatable structure; such at least one ballast-valving interface is structured and arranged to respond to such at least one controller; and such at least one ballast-valving interface is further structured and arranged to selectively enable such at least one flowable ballast substance to selectively flow into or out of individual ballast tanks of such at least one plurality of ballast tanks.

Even further, it provides such a apparatus further comprising: at least one third plurality of sensors associated with such materials and respectively spaced at respective sensor locations along at least one transverse width of such materials substantially perpendicular to at least one longitudinal axis of such structure; wherein such at least one controller is structured and arranged to take dynamic support action responsive to outputs of such at least one third plurality of sensors; wherein each respective sensor of such at least one third plurality of sensors is essentially structured and arranged to measure respective relative inclination at a respective sensor location along such at least one transverse width; wherein each such sensor of such at least one third plurality of sensors essentially provides information in relation to such transverse relative inclinations in respective portions of such structure to such at least one controller; and wherein such dynamic support action by such at least one controller comprises minimizing of such transverse relative inclinations; wherein deflections in such materials of such transverse respective portions may be controlled; and wherein such at least one action system is structured and arranged to perform such transverse dynamic support action.

Moreover, it provides such a apparatus wherein: each such sensor of such at least one third plurality of sensors comprises at least one inclinometer sensor; and each such at least one inclinometer sensor comprises at least one inclination transducer adapted to provide at least one electrical output proportioned as to the angular variation from gravity vector. Additionally, it provides such a apparatus wherein essentially each of such first plurality of sensors, such second plurality of sensors, and such position sensor, is connected by at least one network protocol to such at least one control system. Also, it provides such a apparatus wherein: each such sensor of such at least one first plurality of sensors, such at least one second plurality of sensors, and such at least one position sensor comprises at least one inclinometer sensor; each such at least one inclinometer sensor comprises at least one inclination transducer adapted to provide at least one electrical output proportioned as to the angular variation from gravity vector; and such at least one electrical output substantially relates to at least one trim angle of such elongated floatable structure.

In addition, it provides such a apparatus wherein: each such at least one inclinometer sensor of such at least one first plurality of sensors, such at least one second plurality of sensors, and such at least one position sensor further comprise at least one inclination transducer structured and arranged to provide at least one electrical output proportioned as to the angular variation from gravity vector; and such at least one electrical output substantially relates to at least one roll (list angle) of such elongated floatable structure. And, it provides such a apparatus wherein: each such at least one inclinometer sensor of such at least one first plurality of sensors, such at least one second plurality of sensors, and such at least one position sensor further comprise at least one inclination transducer structured and arranged to provide at least one electrical output proportioned as to the angular variation from gravity vector; such at least one electrical output substantially relates to at least one trim angle and at least one list angle; and such at least one electrical output is substantially determined by variations of electrical resistance associated with at least one resistance bridge as such at least one resistance bridge experiences such at least one trim angle and such at least one list angle.

Further, it provides such a apparatus wherein: such at least one controller further comprises at least one sensor-signal collector circuit structured and arranged to attach to such at least one first plurality of sensors and such at least one second plurality of sensors and such at least one position sensor; and such at least one sensor-signal collector circuit provides at least one sensor-signal converter. Even further, it provides such an apparatus wherein such at least one sensor-signal converter converts at least one sensor analog signal to at least one digital signal. Moreover, it provides such an apparatus wherein such at least one sensor-signal collector circuit provides at least one serial data stream to at least one network protocol data stream. Additionally, it provides such an apparatus wherein such at least one network protocol comprises Ethernet protocol. Also, it provides such a apparatus wherein: such at least one controller further comprises at least one power supply structured and arranged to provide power to such at least one first plurality of sensors and such at least one second plurality of sensors and such at least one position sensor; and such at least one power supply comprises at least one power circuit adapted to provide power to at least one power-over-Ethernet protocol switch. In addition, it provides such an apparatus further comprising such at least one floatable structure. And, it provides such an apparatus wherein: such at least one floatable structure comprises at least one dry dock; and such flowable ballast substance comprises water upon which such at least one dry dock is afloat. Further, it provides such a apparatus wherein such at least one dry dock comprises: at least one starboard wing-wall extending substantially along such at least one first sub-length; at least one port wing-wall extending substantially along such at least one second sub-length; and at least one floor extending substantially between such at least one starboard wing-wall and such at least one port wing-wall; wherein such first plurality of sensors is attached along such at least one starboard wing-wall; wherein such second plurality of sensors is attached along such at least one port wing-wall; and wherein such at least one position sensor is attached midships along such at least one floor.

In accordance with another preferred embodiment hereof, this invention provides a retrofitting method, relating to providing enhanced control of deflections of materials in at least one large, dynamically-supported, elongated structure, wherein such structure comprises a first set of sensors spaced along a first length of such structure, such retrofitting method comprising the steps of: providing a second set of sensors to replace such first set of sensors; wherein essentially each of such second set of sensors comprises a more direct measurement of inclination than essentially each of such first set of sensors; and installing such second set of sensors in such structure; wherein at least one existing controller for controlling such deflections, usable with such first set of sensors, in essentially unmodified form, is useable with such second set of sensors. Even further, it provides such a method wherein such step of installing such second set of sensors in such structure comprises the step of: decoupling such first set of sensors, providing a measure of elevation, from such at least one existing controller; and operably coupling such second set of sensors, providing substantially a measure of inclination, with such at least one existing controller.

In accordance with another preferred embodiment hereof, this invention provides a method, relating to controlling deflections of materials of at least one large, dynamically-supported, elongated floatable structure having a plurality of dynamic support points, comprising the steps of: installing at least one first set of sensors associated with such materials and respectively spaced at respective sensor locations along at least one first length of such materials substantially parallel to at least one longitudinal axis of such structure; and installing at least one controller adapted to take dynamic support action responsive to outputs of such at least one first plurality of sensors; installing at least one action system structured and arranged to perform such dynamic support action; wherein each respective sensor of such at least one first plurality of sensors is essentially adapted to measure respective relative inclination at a respective sensor location along such at least one first length of such materials; wherein such each such sensor essentially provides information in relation to relative inclinations in respective portions of such structure to such at least one controller; wherein such dynamic support action by such at least one controller comprises minimizing of such relative inclinations; and wherein deflections in such materials of such respective portions may be controlled. Moreover, it provides such a method further comprising the steps of: identifying within such at least one first length, at least one first sub-length and at least one second sub-length, each one oriented substantially parallel to at least one longitudinal axis of such structure; arranging such at least one first set of sensors to comprise at least one first plurality of sensors and at least one second plurality of sensors; spacing such at least one first set of sensors at respective sensor locations along such at least one first sub-length and associating such at least one first set of sensors with such materials of such at least one first sub-length; spacing such at least one second set of sensors at respective sensor locations along such at least one second sub-length and associating such at least one second set of sensors with such materials of such at least one second sub-length.

Additionally, it provides such a method further comprising the step of: providing at least one position sensor located midships of such elongated floatable structure; and operably coupling such at least one position sensor to such at least one controller to essentially provide at least one reference indicating position of such elongated floatable structure with respect to at least one horizon; wherein such at least one action system, responsive to such at least one controller, essentially assists such structure to seek to remain in essentially a horizontal plane. Also, it provides such a method further comprising the steps of: merging information from such at least one first plurality of sensors, such at least one second plurality of sensors, and such at least one position sensor within such at least one controller; determining at least one action by such at least one action system, using such merged data, to essentially assists such structure to seek to remain in such essentially a horizontal plane; and initiating by such at least one controller, such at least one action of such at least one action system. In addition, it provides such a method further comprising the steps of: providing within such at least one action system, at least one ballast-pumping-system interface adapted to assist action-system controlled pumping of at least one flowable ballast substance by at least one ballast pumping system of such elongated floatable structure; providing within such at least one action system, at least one plurality of ballast-tank sensors structured and arranged to respectively measure the flowable ballast substance contained within a plurality of ballast tanks of such elongated floatable structure, wherein such at least one pumping-system interface is structured and arranged to assist move such flowable ballast substance in and out of selected ballast tanks among such at least one plurality of ballast tanks in accordance with control of such at least one controller; and providing within such at least one action system, at least one ballast-valving interface structured and arranged to interface with at least one ballast-valving system of such elongated floatable structure; wherein such at least one ballast-valving interface is structured and arranged to respond to such at least one controller; and wherein such at least one ballast-valving interface is further structured and arranged to selectively enable such at least one flowable ballast substance to selectively flow into or out of individual ballast tanks of such at least one plurality of ballast tanks.

And, it provides such a method further comprising the steps of: providing at least one third plurality of sensors associated with such materials and respectively spaced at respective sensor locations along at least one transverse width of such materials substantially perpendicular to at least one longitudinal axis of such structure; operably coupling outputs of such at least one third plurality of sensors with such at least one controller; wherein each respective sensor of such at least one third plurality of sensors is essentially adapted to measure respective relative inclination at a respective sensor location along such at least one transverse width; wherein each such sensor of such at least one third plurality of sensors essentially outputs information in relation to such transverse relative inclinations in respective portions of such structure to such at least one controller; wherein such dynamic support action by such at least one controller comprises minimizing of such transverse relative inclinations; wherein deflections in such materials of such transverse respective portions may be controlled; and wherein such at least one action system structured and arranged to perform such transverse dynamic support action. Further, it provides such a method further comprising the step of connecting essentially each of such first plurality of sensors, such second plurality of sensors, and such position sensor to such at least one control system by at least one network having at least one network protocol. In accordance with another preferred embodiment hereof, this invention provides an apparatus, relating to monitoring deflections of materials of at least one large, floating, elongated dry dock, comprising: at least one first plurality of sensors associated with such materials and respectively spaced at respective sensor locations along at least one first length of such materials substantially parallel to at least one longitudinal axis of such structure; and at least one monitor adapted to make indications responsive to outputs of such at least one first plurality of sensors; wherein each respective sensor of such at least one first plurality of sensors is essentially adapted to measure respective relative inclination at a respective sensor location along such at least one first length of such materials; wherein such each such sensor essentially provides information in relation to relative inclinations in respective portions of such structure to such at least one monitor; and wherein deflections in such materials of such respective portions may be monitored. In addition, this invention provides each and every novel feature, element, combination, step and/or method disclosed or suggested by this patent application.

DETAILED DESCRIPTION OF THE BEST MODES AND PREFERRED EMBODIMENTS OF THE INVENTION

Figure 1:
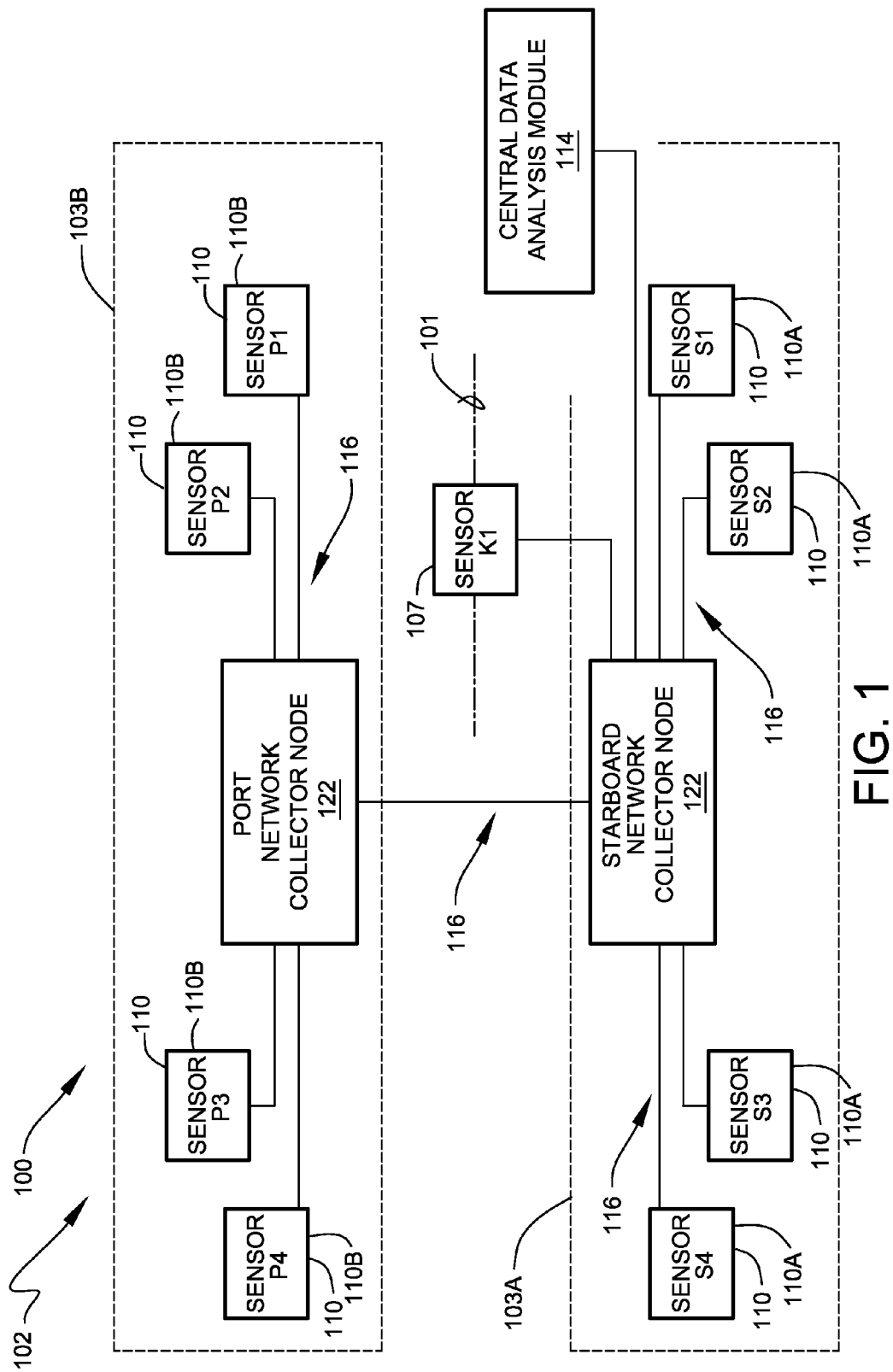
FIG. 1 shows an overall schematic diagram, illustrating a Digital Sensor Deflection Monitor adapted to monitor structural deflections within a large, dynamically-supported, elongated floatable structure, according to a preferred embodiment of the present invention.
Figure 2:
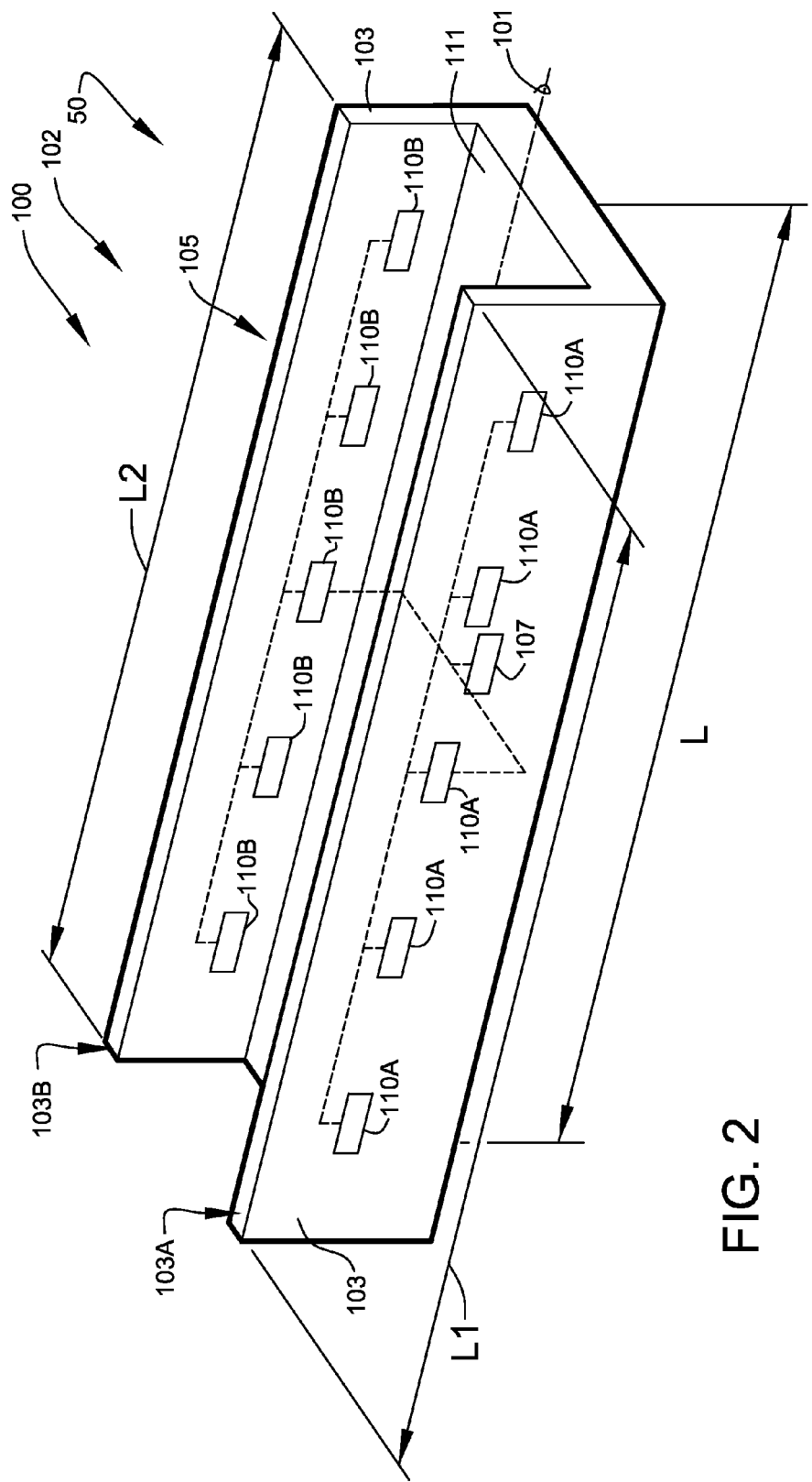
FIG. 2 shows a schematic diagram, illustrating a preferred longitudinal distribution of sensor units within a floating dry dock, according to a preferred embodiment of the present invention.

FIG. 1 shows an overall schematic diagram illustrating Digital Sensor Deflection Monitor 102 for substantially continuously measuring multiple types of structural deflections within a large, dynamically-supported, elongated floatable structure 50. FIG. 2 shows a schematic diagram illustrating a preferred longitudinal distributed of sensor units within a floating dry dock 105, according to a preferred embodiment of the present invention.

Digital Sensor Deflection Monitor 102, hereinafter referred to as DSDM 102 preferably uses an arrangement of solid state sensor units 110 mounted at various monitoring points throughout the elongated floatable structure 50. In a highly preferred application of the technology, DSDM 102 is preferably used to monitor structural deflections within floating dry dock 105, as shown.

DSDM 102 is a preferred embodiment of floating dock deflection management system 100, which preferably comprises additional preferred system embodiments, preferably including embodiments capable of overall automated operation and control. The key goals of the preferred embodiments of floating dock deflection management system 100 are to increase operations efficiency and to provide safe and accurate control of such large floatable structures.

Floating dry docks, such as floating dry dock 105, are an important class of such large, dynamically-supported, elongated floatable structures. Floating dry docks are typically made of steel and have an arrangement of air-tight "ballast tanks" that allow the dry-dock to be submerged so that a ship or marine vessel can drive into it and then be picked up so that it is above the waterline, on a dry deck, for repair and/or maintenance. Simply stated, the ballast tanks are flooded with a flowable ballast substance (most preferably the seawater in which the dock resides) when the dock is lowered and that same ballast water is pumped out to lift the dock structure in the upward direction. This modulation of buoyancy must be carried out in a controlled manner to avoid failure of the dock structure.

Floating dry docks are inherently stiff and excessive stress (deflection) during operation can cause the vessel to break. Dry docks can become unsafe when operated poorly. Depending on the loading or unloading of the ballast tanks, the dry dock can bend. If bending tolerances of the materials are exceeded, the dry docks can suffer a catastrophic failure. This bending of the dry dock is known as deflection.

Floating dry dock 105 comprises a longitudinal axis 101 extending through the midline of the structure, as shown. A typical preferred configuration of floating dry dock 105 comprises a generally "U" shaped cross-section, as shown, the dock structure preferably comprising a dock floor 111 spanning between two wing walls 103, as shown in FIG. 2. Wing walls 103 (inclusive of starboard wing wall 103A and port wing wall 103B) are preferably oriented generally parallel with the longitudinal axis 101 and extend continuously along a longitudinal length L of the dock, as shown. The dock floor 111 supports the weight of the dry-docked vessel and the wing walls 103 are used, in part, to give the floating dry dock 105 stability when dock floor 111 is submerged.

A preferred embodiment of DSDM 102 is adapted to function as a stand-alone monitoring system, preferably providing computer-assisted monitoring and reporting of a vessel's structural performance. Alternate preferred embodiments of DSDM 102 are adapted to be operable with one or more comprehensive dock operations and control systems, as generally described in FIG. 8. The primary preferred function of DSDM 102 is to provide information to safely operate floating dry dock 105 without over-stressing the materials of the dock structure.

In the simplest preferred embodiment of DSDM 102, measurements of the "hog" (upwards longitudinal deflection), and "sag" (downwards longitudinal deflection) are provided. In addition to the hog and sag readings, the basic system is preferably capable of providing several types of bend, flex, stress, and angular information about the dock structure, which are not conventionally available to the operator of floating dry dock 105. Also included in this preferred array of information is data that can be used to calculate strain within the wing walls 103 during haul-in and haul-out of the vessel to be repaired.

DSDM 102 is preferably organized around multiple sensor units 110, central data analysis module 114, and one or more networked communication links 116 interconnecting the array of sensor units 110 to central data analysis module 114, as shown. Central data analysis module 114 (at least embodying herein at least one controller) preferably comprises a computer processor that preferably creates a virtual "map" of the dry-dock structure using data from the plurality of sensor units 110. The deflection (bend) within the structure of floating dry dock 105 is preferably calculated by central data analysis module 114 to allow immediate determinations of structural status. Central data analysis module 114 is preferably adapted to communicate immediate and clearly-discernible indications of dock status, preferably responsive to the outputs of sensor units 110. Preferred embodiments of central data analysis module 114 comprise one or more alarm features functioning to alert the dock operator of an approaching maximum structural or positional limit, and to provide an alarm when such a limit has been exceeded.

As a stand-alone system DSDM 102 preferably provides monitoring data essential to safe, automated dock evolutions and dock operations. Preferably, central data analysis module 114 is scalable to expand the system's basic monitoring functions to include active control of the ballast control system 60 within floating dry dock 105 (as further described in FIG. 8). In this alternate preferred embodiment of DSDM 102, central data analysis module 114 is preferably configured to take dynamic support action responsive to outputs of sensor units 110. More specifically, alternate preferred embodiments of DSDM 102 are preferably designed to provide essentially automatic deflection compensation by actively controlling the pumps, valves, and related components of ballast control system 60 (at least embodying herein wherein such at least one controller is structured and arranged to take dynamic support action responsive to outputs of such at least one first set of sensors).

Each sensor unit 110 is preferably associated with materials within a discrete region of the structure. Each sensor unit 110 is essentially adapted to measure respective relative inclination at a respective sensor location along the longitudinal length L the structure. A set of sensors units 110 (at least embodying herein at least one first set of sensors) are preferably mounted at measured locations along longitudinal length L of the structure, preferably along at least one of the two wing walls 103 (at least embodying herein wherein such at least one first set of sensors associated with such materials are respectively spaced at respective sensor locations along at least one first length of such materials substantially parallel to at least one longitudinal axis of such structure). More preferably, sensors units 110 are mounted at measured locations along both of the two wing walls 103, as shown. At least one additional sensor unit 110 (identified in FIG. 1 as sensor K1 and central reference sensor 107 in FIG. 2) is preferably mounted adjacent longitudinal axis 101 (over the keel), preferably as close to the middle of the dock as possible.

To monitor the structure of both wing walls 103, the set of sensor units 110 are preferably arranged into a first plurality of sensor units, preferably identified as starboard sensor units 110A, and a second plurality of sensor units identified as port sensor units 110B. Starboard sensor units 110A are preferably spaced at respective sensor locations along a first sub-length L1 of starboard wing wall 103A, as shown. Port sensor units 110B are preferably spaced at respective sensor locations along a second sub-length L2 of port wing wall 103B, as shown. Both first sub-length L1 and second sub-length L2 are preferably aligned substantially parallel to longitudinal axis 101, as shown.

A typical installation of DSDM 102 will preferably includes additional starboard sensor units 110A and port sensor units 110B, as generally necessitated by the wing wall length, organization of the underlying structures, etc. In general, monitoring by DSDM 102 is optimized by mounting a sensor unit 110 at the junction of every other ballast tank 109 (see FIG. 3) along each wing wall 103. In floating dry docks having both an extended longitudinal length and proportionately large transverse width, additional lines of sensor units 110, extending generally perpendicular to longitudinal axis 101, are preferably used to provide a third sensor array measuring transverse deflection across dock floor 111 (in the least embodying herein at least one third plurality of sensors associated with such materials and respectively spaced at respective sensor locations along at least one transverse width of such materials substantially perpendicular to at least one longitudinal axis of such structure).

A single central reference sensor 107 (position sensor K1) is preferably mounted midships (also known as amidships, which is defined as in or toward the part of a ship midway between bow and stern; or in or toward the middle), preferably along the keel line of floating dry dock 105, preferably as close to the middle of the dock floor 111 as possible. Central reference sensor 107 (at least embodying herein at least one position sensor located midships of such elongated floatable structure), preferably provides important reference data required to complete the preferred deflection calculations performed by data analysis module 114. More specifically, central reference sensor 107 essentially provides reference data indicating position of elongated floatable structure 50 with respect to the horizon. Central reference sensor 107 is preferably used to determine whether the overall front to the back tilt of floating dry dock 105 is the same as that calculated, or whether a portion of the dock is actually bending more than expected. When central reference sensor 107 is used, the actual deflection can be determined with great accuracy.

The sensing elements within sensor units 110 are preferably substantially electronic (with no moving parts). Each sensor unit 110 preferably comprises a small electronic inclinometer 112 (see FIG. 4), preferably comprising a very sensitive digital biaxial (dual axis) clinometer. Preferably, each electronic inclinometer 112 is designed to measure angular position, preferably rotation in two orthogonal vertical planes with respect to vertical gravity vector. A preferred electronic inclinometer apparatus suitable for use with sensor unit 110 includes Model 900 Biaxial Clinometers produced by Applied Geomechanics Inc. of Santa Cruz, Calif. U.S.A. The Model 900 Biaxial Clinometers utilize a non-conductive vial partially filled with a conductive liquid. When the sensor is level, the fluid covers a plurality of internal electrodes to an equal depth. When the sensor tilts, the depth of the fluid over each electrode changes, altering the electrical resistance between matched pairs of electrodes. The onboard electronics of the sensor measure these changes, converting them to DC outputs proportional to the tilt angle (at least embodying herein at least one inclination transducer adapted to provide at least one electrical output proportioned as to the angular variation from gravity vector). Since the preferred electronic inclinometer 112 are not based on optical technology, DSDM 102 does not require line-of-sight or clear weather to operate.

The preferred electronic inclinometers 112 are extremely accurate sensors, capable of measuring within micro-radians across both axes. Utilizing the above-noted electronic inclinometers 112, DSDM 102 is capable of providing readings that are accurate to about 2 millimeters over a 100-meter dock.

Preferably, each electronic inclinometer 112 is rigidly mounted within a protective enclosure housing 113, which in turn is rigidly mounted to a structural member of floating dry dock 105. This enables each electronic inclinometer 112 to move in concert with the underlying material of the structure (at least embodying herein wherein such at least one first set of sensors is associated with such materials).

Figure 3:
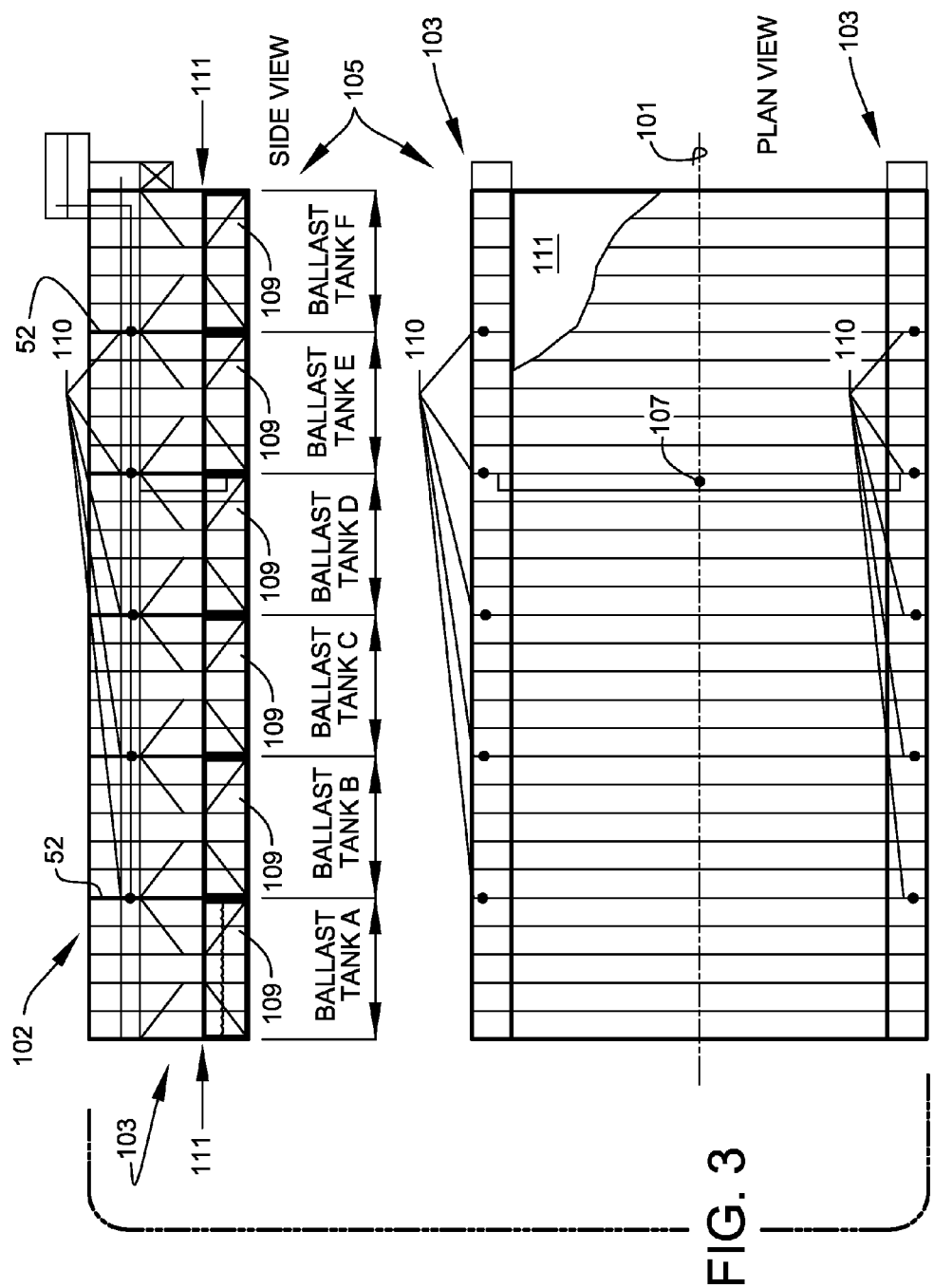
FIG. 3 shows a schematic structural diagram, of preferred placements of sensor units within the floating dry dock, according to the preferred installation of FIG. 1.

Preferably, each sensor unit 110 provides the data analysis computer with two axes of measurement; the y-axis is longitudinal along the length of the dock (trim angle—from forward to aft) and the x-axis is measuring laterally across the dock (list angle—from port to starboard). Each sensor unit 110 positioned within the structure returns the list and trim angle at the specific point of attachment. Once mounted, each electronic inclinometer 112 returns a high precision reading of both list and trim angle at the mounting location. Preferably, for maximum system performance, one sensor unit 110 is preferably mounted at each supporting structural beam 52 separating ballast tanks 109 within wing walls 103, as best illustrated in FIG. 3. If this preferred arrangement is not feasible, sensor units 110 are alternately preferably placed between every other ballast tank 109. If this preferred arrangement is not feasible, sensor units 110 are alternately preferably mounted to a stable element as close to a supporting structural beam separating ballast tanks 109 as possible.

Preferably, sensor units 110 are securely mounted onto the structural beams such that their respective enclosure housings 113 are mounted substantially level (preferably within about 2 degrees) in relation to each other and to the normal zero position of the keel of floating dry dock 105. In a preferred method of mounting, one side of closure housing is aligned with the keel of floating dry dock 105 before being surface mounted to the structural member. Enclosure housing 113 preferably comprises a surface mounted NEMA-type metal enclosure, preferably rated for use in harsh environments.

Figure 4:
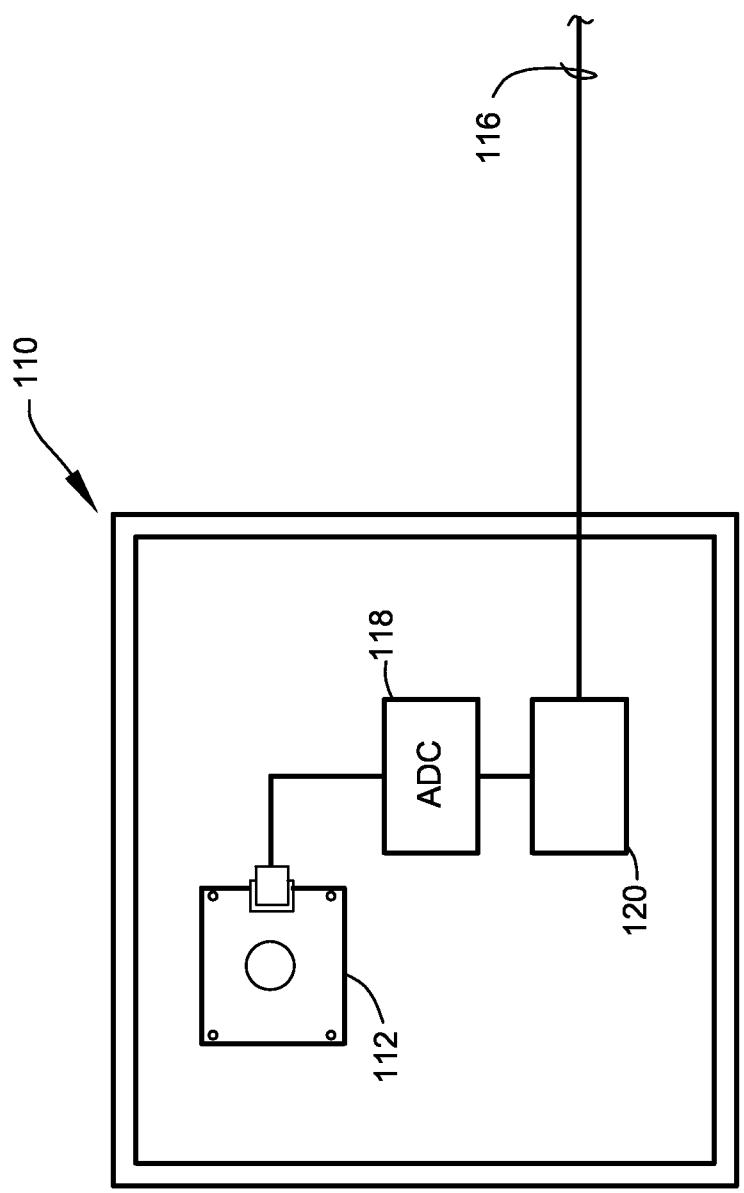
FIG. 4 shows a diagrammatic illustration, of preferred circuiting arrangements of a single sensor unit, according to a preferred embodiment of the present invention.

FIG. 4 shows a diagrammatic illustration of preferred circuiting arrangements of a single sensor unit 110, including circuiting supporting network communication link 116 with central data analysis module 114. Preferably, the analog voltage output from electronic inclinometer 112 is applied to at least one sensor-signal converter circuit, preferably comprising analog-to-digital converter (ADC) 118, as shown. Preferably, ADC 118 converts the analog signal to a digital representation. ADC 118 preferably comprises a minimum 8-bit resolution producing an RS-232 (Recommended Standard 232) serial binary data signal. The circuit may preferably comprise secondary support circuits, of types well known to those of ordinary skill in the art, such as reference voltage circuits, signal filtering circuits, buffering circuits, etc., as may be required to support the analog to digital conversion process.

The serial data output from ADC 118 is subsequently conformed to at least one standard network communication protocol. In a highly preferred embodiment, Ethernet communication protocol is utilized. Sensor unit 110 preferably comprises network interface hardware 120 allowing the serial data stream from ADC 118 to be transmitted to central data analysis module 114 via networked communication link 116, as shown. Network interface 120 preferably comprises at least one RS232 to Ethernet interface device. Networked communication link 116 preferably implements the Internet protocol suite (commonly referred to as TCP/IP), preferably utilizing fixed IP (Internet Protocol) addresses for all network devices; thus, it is preferred that each network interface 120 be structured and arranged to support a fixed IP address for its respective sensor unit 110. It is noted that preferred embodiments of sensor unit 110 combine ADC 118 and network interface 120 into a single unified device.

The preferred architecture of networked communication link 116 preferably comprises industry standard 10BaseT Ethernet, preferably using standard Category 5 or alternately preferably Category 6 wire throughout. In a preferred network organization, the network connections for individual sensor units 110 are routed to an intermediate network collector node 122 located centrally within respective wing walls 103, as shown. Each network collector node 122 preferably comprises an Ethernet switch, most preferably, at least one power-over-Ethernet protocol switch, preferably adapted to provide operating electrical power to the plurality of distal sensor units 110 (at least embodying herein at least one power-over-Ethernet protocol switch structured and arranged to provide electrical power to such at least one first plurality of inclinometer sensors and such at least one second plurality of inclinometer sensors and such at least one position inclinometer sensor). Each network collector node 122 is preferably of a type hardened for industrial applications.

Network communication link 116 preferably comprises a dedicated local network (having no external links); however, one advantage provided by the preferred use of standard network protocols is the ability to inexpensively retrofit existing vessels by utilizing existing network infrastructure. For example, a preferred installation may preferably utilize an existing Ethernet-based camera system or equivalent data network. Upon reading the teachings of this specification, those of ordinary skill in the art will now understand that, under appropriate circumstances, considering such issues as user preference, intended use, etc., other hardware/software arrangements, such as the use of additional network interfaces, multiple redundant network configurations, access to an external enterprise system of the dock's owner/operator, internet connections supporting remote monitoring or data logging, etc., may suffice.

Preferably, network communication link 116 enables the acquisition of sensor data from the plurality of sensor units 110 by central data analysis module 114 in "real time" (at least embodying herein wherein such at least one controller further comprises at least one sensor-signal collector circuit adapted to attach to such at least one first plurality of inclinometer sensors and such at least one second plurality of inclinometer sensors and such at least one position inclinometer sensor). Preferably, central data analysis module 114 compares the list angle and trim angle information from each of sensor units 110 and uses geometrical algorithms to create a virtual "map" of the wing walls 103, which closely matches the current state of the sensors and underlying structure of the dock. The deflection (bend) of the sections of floating dry dock 105 between sensor units 110 can be extrapolated by these calculations essentially in "real time". Preferably, the overall shape of the monitored wing walls 103, and physical location of any position along the wing walls 103 (relative to any other) is determined by central data analysis module 114 using such mathematical algorithms.

Figure 5:
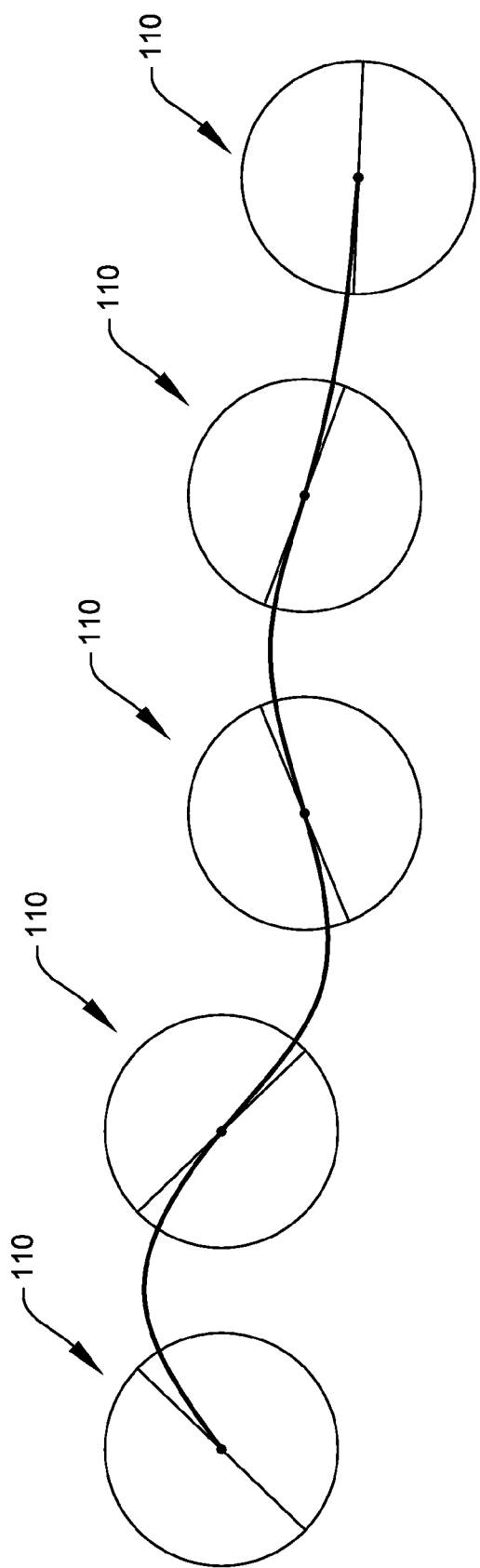
FIG. 5 shows a schematic illustration, of simplified calculations for five digital inclinometer-based sensors mounted along a single wing wall of floating the dry dock, according to a preferred embodiment of the present invention.

FIG. 5 shows a schematic illustration, of simplified calculations for five digital inclinometer-based sensors mounted along a single wing wall 103 of floating dry dock 105, according to a preferred embodiment of the present invention. FIG. 5 shows only simplified (and much exaggerated) calculations derived from data associated with a single line of 5 sensor units 110 mounted axially along wing wall 103. It is noted that, with data from additional sensor units 110 located within both wing walls 103 and data from a central reference sensor 107 located in the approximate center of the dock, the calculations and resulting map will be substantially more complex than is shown in FIG. 5.

Figure 6:
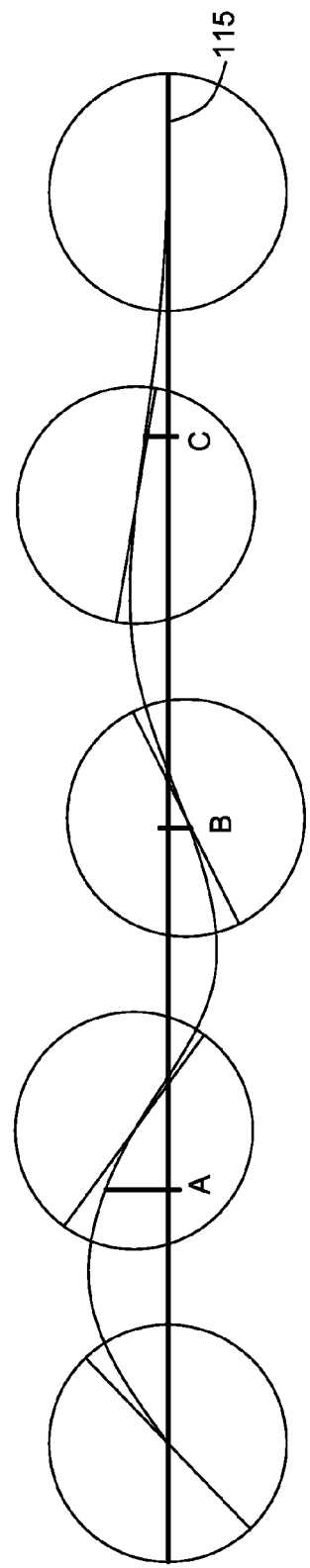
FIG. 6 shows a schematic illustration, of simplified calculations for a single axis five digital inclinometer-based sensors mounted along a wing wall of a dry dock, according to a preferred embodiment of the present invention.

FIG. 6 shows a schematic illustration, of calculations derived from a similar plurality of sensor units 110, which are placed linearly along a calculated centerline, with deflection measured at three standard-points A, B, C along a single wing wall 103 of floating dry dock 105, according to a preferred embodiment of the present invention. In this example, data from central reference sensor 107 (associated with the substantially horizontal baseline 115) is preferably used to determine whether the overall tilt of dry dock 100 is the same as that calculated from the front to the back, or whether a portion of the dock is actually bending more than expected.

Figure 7:
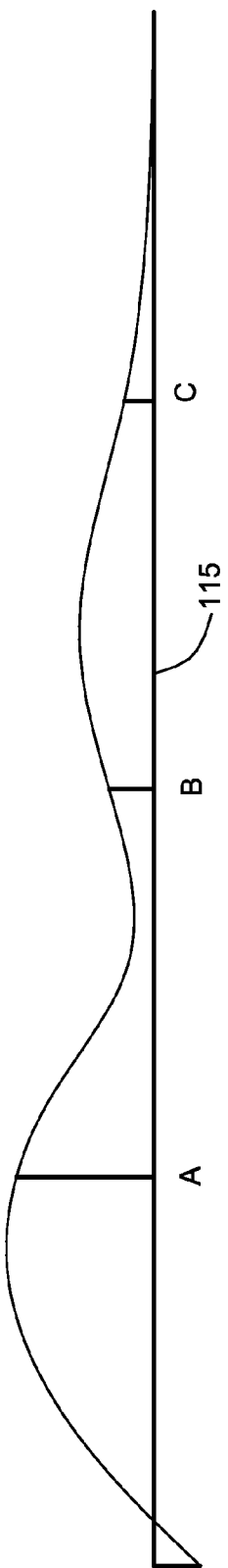
FIG. 7 shows a schematic illustration, of sensors are placed linearly along a calculated centerline and deflection measured at 3 selected points along a wing wall of the floating dry dock, according to a preferred embodiment of the present invention.

FIG. 7 shows a second simplified and overtly exaggerated graphical representation of the preferred calculations used in FIG. 6. Preferably, the preferred calculations are then referenced to central reference sensor 107 (baseline 115) and split along the selected points for legacy reporting, as shown. In addition to the legacy data, additional information (such as "point of greatest deflection") is generated and reported. With the precision level of the preferred electronic inclinometers 112, the deflection distance accuracy at midpoint between two sensor units 110 mounted about 20 meters apart is theoretically about 0.05 millimeters. In actual use, sensor units 110 are damped to provide readings accurate to about 1 millimeter over that distance. DSDM 102 preferably provides information which is arranged into overall, wing-wall specific, and cross section specific groupings. The following is a partial list of preferred data items available in essentially "real time" from DSDM 102.

Dock Overall Deflection Information:
  Trim and List
  Tilt Direction and Angle
  Longitudinal Deflection (Hog/Sag)
  Longitudinal & Transverse Skew (Twist)
  Longitudinal Linearity
  Transverse Deflection (wall toe-in/out)
  Transverse Squareness (wall/keel trim)
Wing Wall Specific Information:
  Wall Trim
  Wall Deflection and Skew
  Sectional Deflection
  Greatest Deflection Point
  Longitudinal Deflection (Hog/Sag)
Cross Section (Fwd/Mid/Aft) Information:
  Sectional List
  Transverse Deflection
  Transverse Skew
  Transverse Squareness Real time deflection monitoring within DSDM 102 is preferably implemented by executing one or more monitoring programs within a physical processor of central data analysis module 114. Central data analysis module 114 preferably comprises at least one general purpose computer platform. Preferably, the computer contains a central processing unit (CPU) and associated circuitry, memory, and a variety of input/output (I/O) devices to provide a communication interface with network communication link 116, as shown. Alternate preferred embodiments of central data analysis module 114 comprise at least one computer/user interface to allow for user interaction. Such I/O devices preferably comprise devices of the sort well known in the art. For example, preferred embodiments of central data analysis module 114 preferably comprise a display screen or monitor, keyboard, mouse, etc. Preferably, the memory stores monitoring program (or programs) of DSDM 102 that are executed to enable the preferred monitoring methods and processes described herein. Preferably, when the preferred computing platform of DSDM 102 executes such a program, it becomes a special-purpose device and thus an integral portion of DSDM 102. Upon reading the teachings of this specification, those of ordinary skill in the art will now understand that, under appropriate circumstances, considering such issues as user preference, intended use, etc., other hardware/software arrangements, such as the use of additional network interfaces, wireless network communication, network firewalls, internet connections, security encryptions, data-logging capabilities, etc., may suffice.

Central data analysis module 114 is preferably adapted to communicate immediate and clearly-discernible indications of dock status, preferably responsive to the outputs of sensor units 110. Preferred embodiments of central data analysis module 114 comprise one or more alarm features functioning to alert the dock operator of an approaching maximum structural or positional limit, and to provide an alarm when such a limit has been exceeded.

As a stand-alone system DSDM 102 preferably provides monitoring data essential to safe, automated dock evolutions and dock operations. Preferably, central data analysis module 114 is scalable to expand the system's basic monitoring functions to include full dock operations and control capabilities, as described in FIG. 8.

Figure 8:
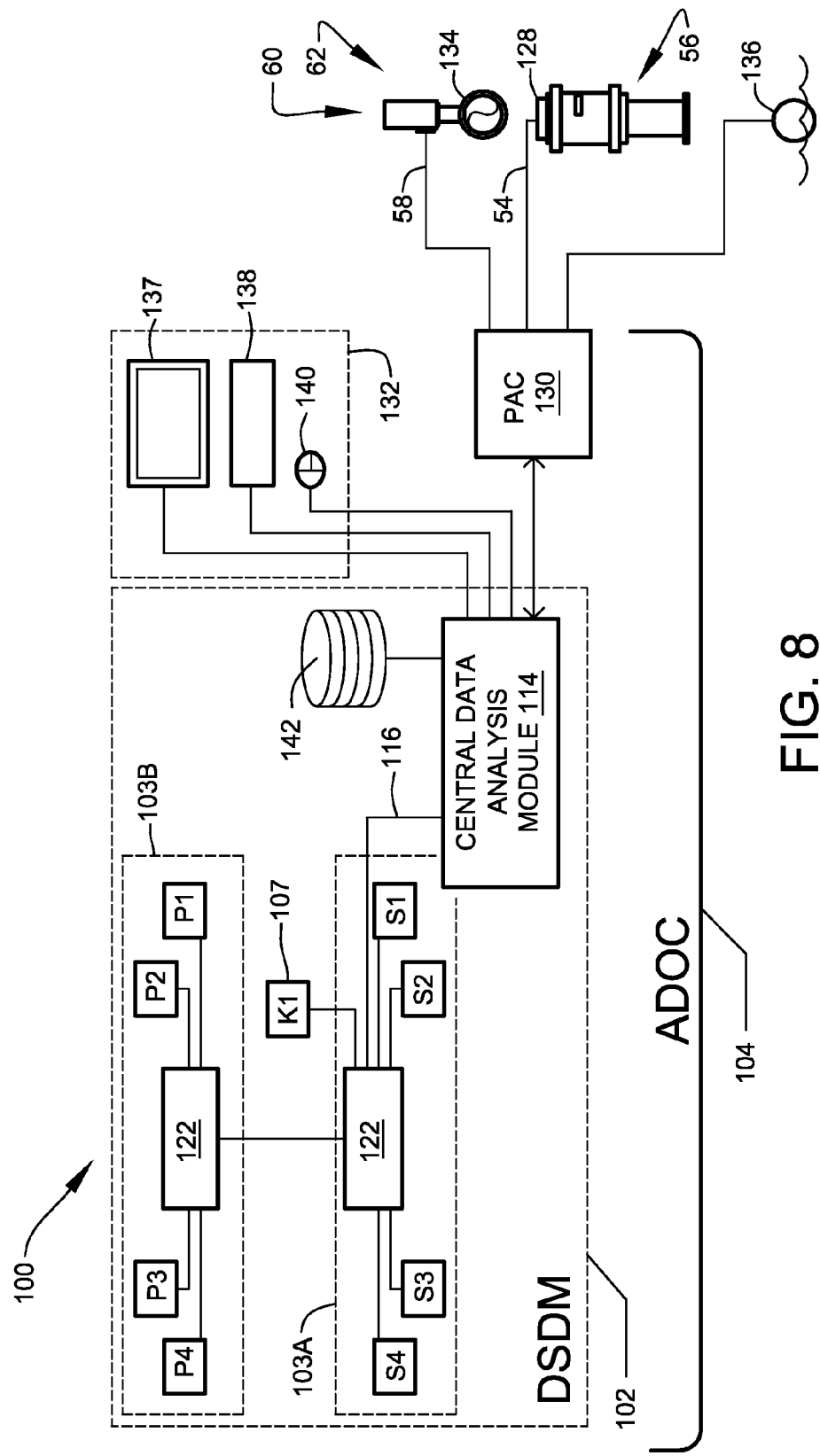
FIG. 8 shows an overall schematic diagram, illustrating an Automated Dock Operating Controller, according to a preferred embodiment of the present invention.

FIG. 8 shows an overall schematic diagram illustrating Automated Dock Operating Controller 104, hereinafter referred to as ADOC 104, according to a preferred embodiment of the present invention. ADOC 104 preferably expands the inclinometer-based monitoring of DSDM 102 to include automated dock operations and control functions. ADOC 104 preferably provides automated ballast control and deflection compensation, within floating dry dock 105, including during dock sinking or raising (evolution) operations. ADOC 104 preferably takes dynamic support action to minimize relative inclinations within the dry dock structure (at least embodying herein wherein such dynamic support action by such at least one controller comprises minimizing of such relative inclinations). Such preferred dynamic action preferably includes actuation of valves 134 and ballast pumps 128 to fill and evacuate ballast tanks 109, as described below.

ADOC 104 comprises, in addition to the hardware of DSDM 102, proprietary Supervisory Control and Data Acquisition (SCADA) software 142, Programmable Automation Controller (PAC) 130 and supervisory control interface 132, as shown. PAC 130 preferably provides input/output apparatus supporting both data acquisition and hardware control of critical field devices of floating dry dock 105. Such data acquisition and hardware controls preferably include monitoring and control of ballast pumps 128, feedback and actuators for tank valves 134, ballast tank level sensors 136, etc. More specifically, PAC 130 (at least embodying herein at least one action system structured and arranged to perform such dynamic support action) preferably comprises pumping-system interface 54 to interface with ballast pumping system 56 of floating dry dock 105, ballast-valving interface 58 to interface with ballast-valving system 62 of floating dry dock 105, and a plurality of ballast tank level sensors 136 to measure the ballast liquid contained within respective ballast tanks 109 of floating dry dock 105. In addition, PAC 130 may preferably comprise a plurality of tank pressure sensors to monitor the pressure within individual ballast tanks 109.

Pumping-system interface 54 is preferably configured to assists the controlled pumping the flowable ballast substance (seawater) by ballast pumps 128. In a preferred arrangement of the system, pumping-system interface 54 is operably coupled to the relay outputs of ballast pumps 128. Ballast-valving interface 58 enables the seawater to be selectively directed into or out of individual ballast tanks 109. In a preferred arrangement of the system, ballast-valving interface 58 is preferably coupled to the valve actuators and feedback circuits of ballast-valving system 62. The plurality of ballast tank level sensors 136 is structured and arranged to assist monitoring of the movement of the seawater in and out of selected ballast tanks 109 among the plurality of ballast tanks 109. Upon reading this specification, those with ordinary skill in the art will now appreciate that, under appropriate circumstances, considering such issues as cost, user preference, etc., other sensor/control arrangements such as, for example, pump temperature sensors, line-pressure sensors, redundant sensor arrays, automatic shutdown apparatus, remote alarm apparatus etc., may suffice.

Supervisory control interface 132 preferably expands central data analysis module 114 to include a full user interface, preferably comprising display screen or monitor 137, keyboard 138, mouse 140, etc. In a preferred embodiment of supervisory control interface 132, monitor 137 comprises at least one 20" LCD Display for maximum operator efficiency. Supervisory control interface 132 is preferably adapted to allow the operator to enable or disable alarms, ballast control, etc., even when floating dry dock 105 is not transferring.

ADOC 104 preferably operates under proprietary Supervisory Control and Data Acquisition (SCADA) software 142. Such software preferably runs on central data analysis module 114. PAC 130 is preferably integrated with central data analysis module 114 such that operational data generated by SCADA software 142 is passed to hardware-specific software running within PAC 130. Using PAC 130, ADOC 104 is preferably able to implement the necessary adjustments required to safely and accurately raise or lower floating dry dock 105 (at least embodying herein wherein such at least one controller comprises at least one computer processor structured and arranged to respond to deflection information of such sensors and control such action system to minimize any deflections; wherein each such sensor essentially provides information in relation to relative inclinations in respective portions of such structure to such at least one controller; wherein such dynamic support action taken by such at least one controller comprises minimizing of such relative inclinations; and wherein deflections in such materials of such respective portions may be controlled).

Preferably, SCADA software 142 operates within at least one computer operating system software environment, preferably a Microsoft Windows platform. The software graphical user interface of SCADA software 142 is preferably adapted to be intuitive and easy to operate, as generally illustrated in the graphical user interface diagrams of FIG. 11 through FIG. 17. The operator needs only to understand the purpose and function of the dock itself to operate ADOC 104.

SCADA software 142 enables central data analysis module 114 to compare the list and trim information from each of sensor units 110 to create a virtual "map" of the wing walls 103 that closely matches the current state of the structures. The deflection (bend) of the sections of floating dry dock 105 between sensor units 110 can be extrapolated by these calculations essentially in "real time". Preferably, the overall shape of the monitored wing walls 103 and physical location of any position along the wing walls 103 (relative to any other) is determined by central data analysis module 114 using mathematical algorithms. SCADA software 142 preferably gathers and processes the incoming sensor data for relative inclinations in respective portions of the structure (at least embodying herein wherein each such sensor essentially provides information in relation to relative inclinations in respective portions of such structure to such at least one controller; wherein such dynamic support action taken by such at least one controller comprises minimizing of such relative inclinations; and wherein deflections in such materials of such respective portions may be controlled). SCADA software 142 is preferably adapted to filter the incoming sensor data to accommodate normal pitch and roll experienced by the dry dock due to wave action.

Preferably, ADOC 104 comprises a built-in, multi-level, security preferably comprising individual user IDs and passwords. Users can preferably be assigned abilities ranging from monitoring only to operational control, to full developmental capabilities, depending on the security requirements of the intended application.

Preferably, ADOC 104 substantially continuously monitors the status of floating dry dock 105. ADOC 104 is preferably capable of performing system event logging. Preferably, during a raising or lowering transition all statuses and raw data values are preferably logged to allow review of any parameter for historical or maintenance purposes. This information is preferably saved into a standard format capable of being accessed not only through central data analysis module 114, but also through outputs of a standard spreadsheet program.

ADOC 104 is preferably designed with safety as a primary goal. This is preferably accomplished through at least one checklist procedure coded within SCADA software 142. Preferably, the checklist procedure requires a dock master to enter all pertinent vessel data, and the operator to verify operational status of important essential pieces of equipment prior to any raise/lower transition. Preferably, all of the system information must be entered and checked, before the operator can start the event. In order to begin an automated transition (raising or lowering the dock) the operator is preferably required by SCADA software 142 to enter data relating to the current dock configuration. If the checklist is not complete, the dock control system will not run.

ADOC 104 is preferably designed to monitor the status of a transition and react preemptively to any value that is moving in an off-specification direction. In addition, the alarming functionality is preferably designed to warn the operator of any item that is potentially a problem and can preferably suggest appropriate operational responses.

ADOC 104 is preferably designed to operate safely even if a portion of the plurality of sensor units 110 fails (preferably through the use of predictive control sequences and algorithms). Preferably, if needed, the operator can choose to disable the automatic control of ADOC 104 and manually operate all pumps and valves within the control of ADOC 104. This preferred level of flexibility provides a back-up should a catastrophic event occur. If the operator chooses to do so, he or she can preferably disable the automatic controls of the dry dock, and manually control individual or all of the pumps and valves through one or more of the graphical interfaces depicted in FIG. 11 through FIG. 17. Once a valve has been selected, the operator can preferably input a value of 0% to 100% into the value indicator window, and ballast-valving interface 58 will adjust valve will move to that position. To turn on and off a ballast pump 128, the operator can select the pump he/she wishes to manually control, and then with the mouse, click into the On/Off field.

ADOC 104 is preferably designed to fully employ system redundancy. Preferred subsystems ranging from operator interface computer of central data analysis module 114, through the industrial logic controllers of PAC 130, to sensors units 110, and substantially all other intermediate subcomponents can be operated in a redundant fashion. Preferred embodiments of ADOC 104 further comprise a redundant operator Interface structured and arranged to provide a second supervisory control interface 132 with substantially the same information and screens as the primary unit, thus allowing substantially greater flexibility for the operator. In addition, any operator display can preferably be selected as the primary for the purposes of data archival.

Figure 9:
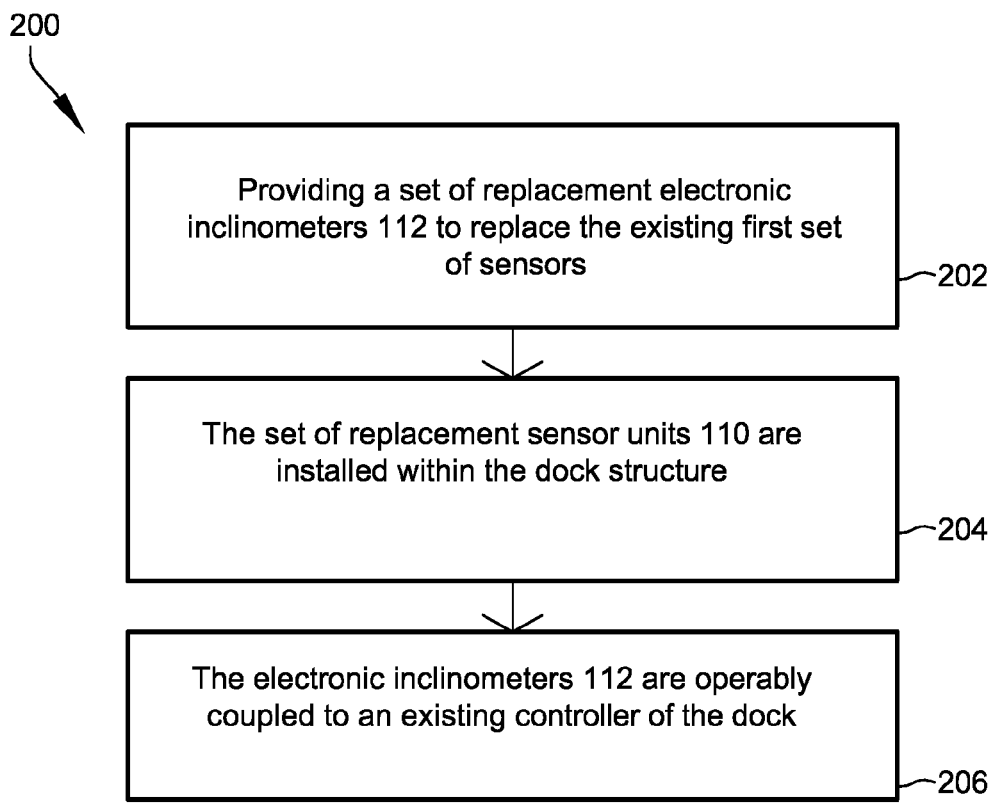
FIG. 9 shows a flow diagram depicting the preferred steps of a method of retrofitting large, dynamically-supported, elongated structures to provide enhanced control of deflections of materials, according to a preferred method of the present invention.

FIG. 9 shows a flow diagram depicting the preferred steps of method 200 for the retrofitting of large, dynamically-supported, elongated structures 50 to provide enhanced control of deflections of materials, according to a preferred method of floating dock deflection management system 100. Preferably, the majority of the hardware within DSDM 102 is designed to interface to most existing (conventional) dock controls of floating dry dock 105. In the preferred steps of method 200 of the present invention, a first set of existing sensors (such as elevation-based sensors) are preferably decommissioned and replaced with small electronic inclinometer 112 (at least embodying herein providing a second set of sensors to replace such first set of sensors wherein essentially each of such second set of sensors comprises a more direct measurement of inclination than essentially each of such first set of sensors). Preferably, the plurality of electronic inclinometers 112 are aligned with the existing controls, either through analog data connections, or digital data connections, as appropriate. In preferred retrofit installations of method 200, electronic inclinometers 112 preferably comprise subcomponents of the above-described sensory units 110. The versatility of such sensory units 110 allows existing controllers to be used for monitoring or control of deflection, in essentially an unmodified form.

Thus, in accordance with method 200, there is an initial preferred step 202 of providing a set of replacement electronic inclinometers 112 to replace the above-noted existing first set of sensors, wherein essentially each of the electronic inclinometers 112 (see FIG. 4) preferably comprises a very sensitive digital biaxial (dual axis) clinometer to provide a more direct measurement of inclination than essentially each of the original sensors. In subsequent preferred step 204, the set of replacement sensor units 110 are installed within the dock structure. In preferred step 204, the original sensors may be decommissioned and abandoned in place or completely removed prior to the new installation. Next, as indicated in preferred step 206, the electronic inclinometers 112 are operably coupled to an existing controller of the dock. Upon reading this specification, those with ordinary skill in the art will now appreciate that, under appropriate circumstances, considering such issues as dock configuration, data interface, etc., other retrofitting arrangements such as, for example, providing dock specific mounting devices, new electrical wiring, new data-network infrastructure, etc., may suffice.

Figure 10:
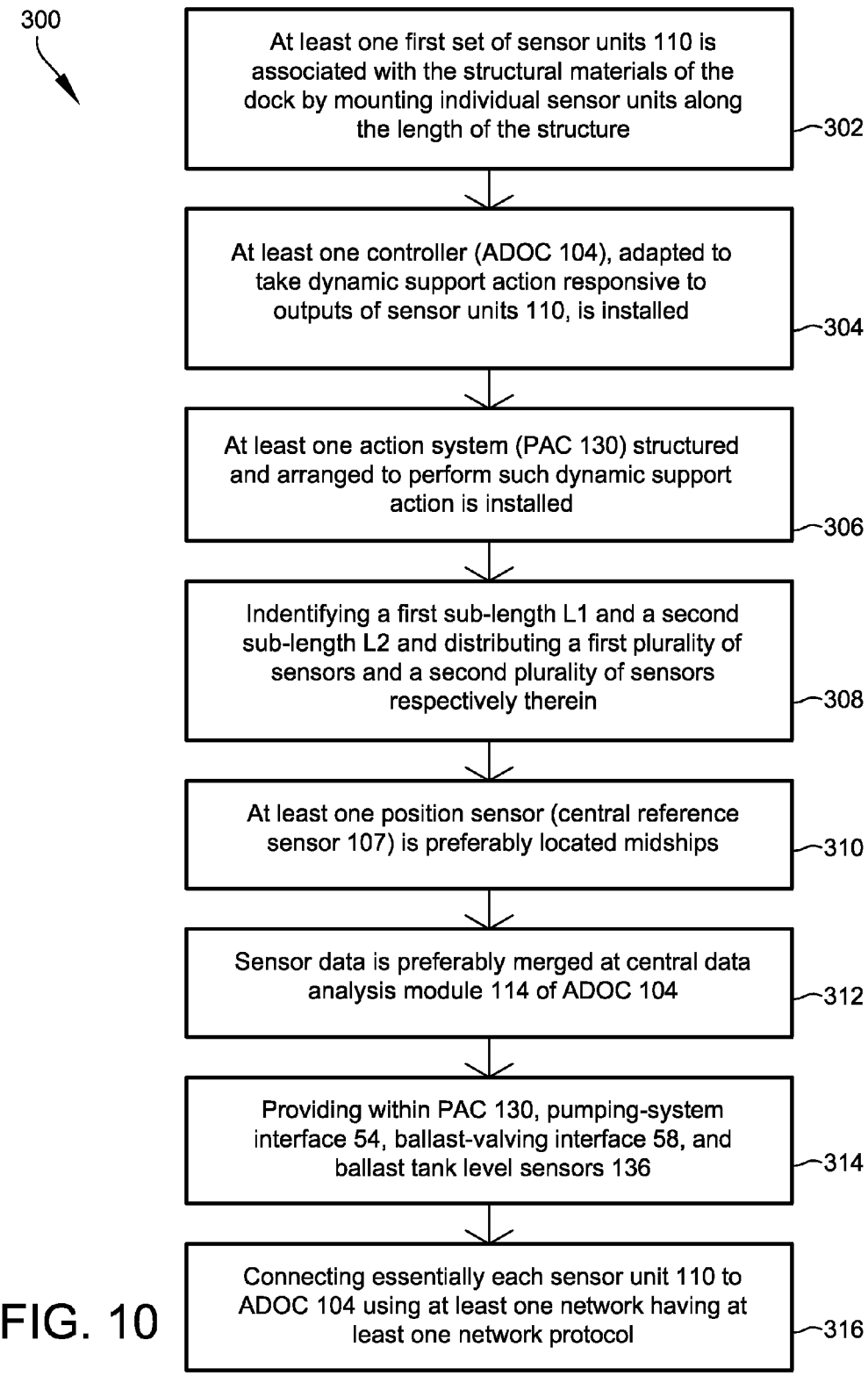
FIG. 10 shows a flow diagram depicting the preferred steps of a method of installing at least one of the preferred embodiments of the present invention within a large, dynamically-supported, elongated structure.

FIG. 10 shows a flow diagram depicting the preferred steps of method 300 of installing at least one of the above-described preferred embodiments of the present invention within a large, dynamically-supported, elongated structure 50. In the initial preferred step 302 of method 300, at least one first set of sensor units 110 is associated with the structural materials of the dock by mounting individual sensor units along the length of the structure. Next, at least one controller (ADOC 104), adapted to take dynamic support action responsive to outputs of sensor units 110, is preferably installed within elongated floatable structure 50, as indicated in preferred step 304. Next, at least one action system (PAC 130) structured and arranged to perform such dynamic support action is preferably installed within elongated floatable structure 50, as indicated in preferred step 306.

In addition, method 300 preferably comprises the preferred step 308 of identifying within the overall length of elongated floatable structure 50, at least one first sub-length L1 and at least one second sub-length L2, preferably associated with starboard wing wall 103A and port wing wall 103B respectively. Within step 308, the first set of sensor units 110 are preferably distributed between starboard wing wall 103A and port wing wall 103B to form a first plurality of sensors and a second plurality of sensors. Next, as indicated in preferred step 310, at least one position sensor (central reference sensor 107) is preferably located midships of elongated floatable structure 50 and coupled to ADOC 104. Next, as indicated in preferred step 312, information from sensor units 110, including central reference sensor 107, are preferably merged at central data analysis module 114 of ADOC 104. ADOC 104 preferably uses the sensor data to determines at least one action, implemented by PAC 130, to essentially assists the dock structure to seek to remain in such essentially a horizontal plane.

In addition, method 300 preferably comprises the preferred step 314 of providing within PAC 130, pumping-system interface 54, ballast-valving interface 58, and ballast tank level sensors 136. In addition, method 300 preferably comprises the preferred step 316 of connecting essentially each sensor unit 110 to ADOC 104 using at least one network having at least one network protocol.

Figure 11:
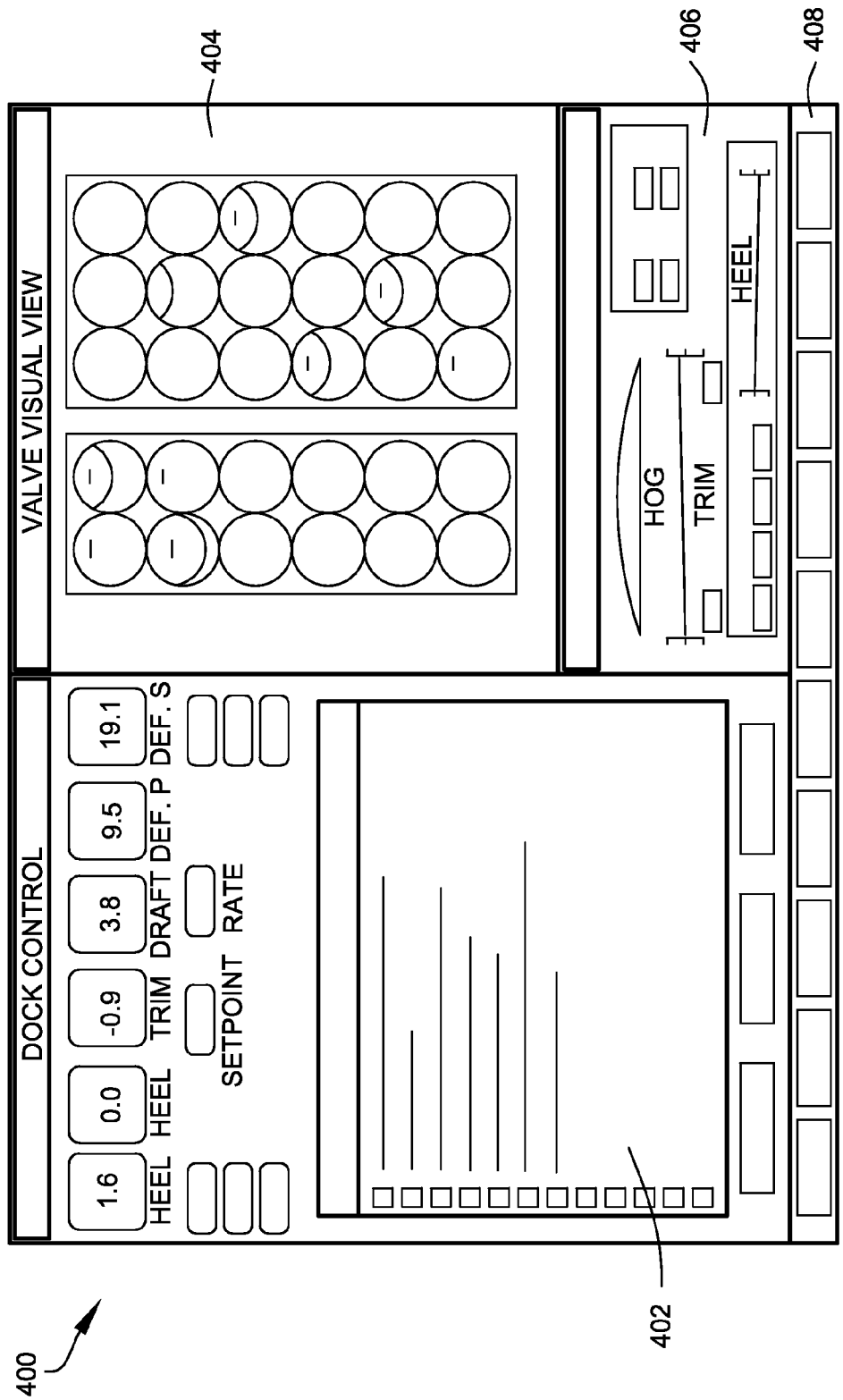
FIG. 11 shows a diagram illustrating a graphical user interface of the Automated Dock Operating Controller, graphically depicting the overall physical status of a monitored dry dock, according to the preferred embodiment of FIG. 8.

FIG. 11 shows a diagram illustrating graphical user interface 400 of ADOC 104, graphically depicting the overall physical status of a monitored floating dry dock 105, according to the preferred embodiment of FIG. 8. The software graphical user interface of SCADA software 142 is preferably accessed through supervisory control interface 132, preferably comprising monitor 137, keyboard 138, mouse 140, etc., as shown in FIG. 8. Graphical user interface 400 is preferably displayed on monitor 137, or similar display device. The basic graphical user interface 400 is preferably divided into checklist window 402, draft/valve/tanks/pump status window 404, small hog/sag/trim/heel status window 406, and menu bar 408, as shown. Graphical user interface 400 preferably allows the operator to access any of the information that is required (at any time) using menu bar 408, along the bottom of the screen. The screens of graphical user interface 400 are preferably displayed in a single window format or a split window format. Pop-up windows are also preferably used as needed.

Figure 12:
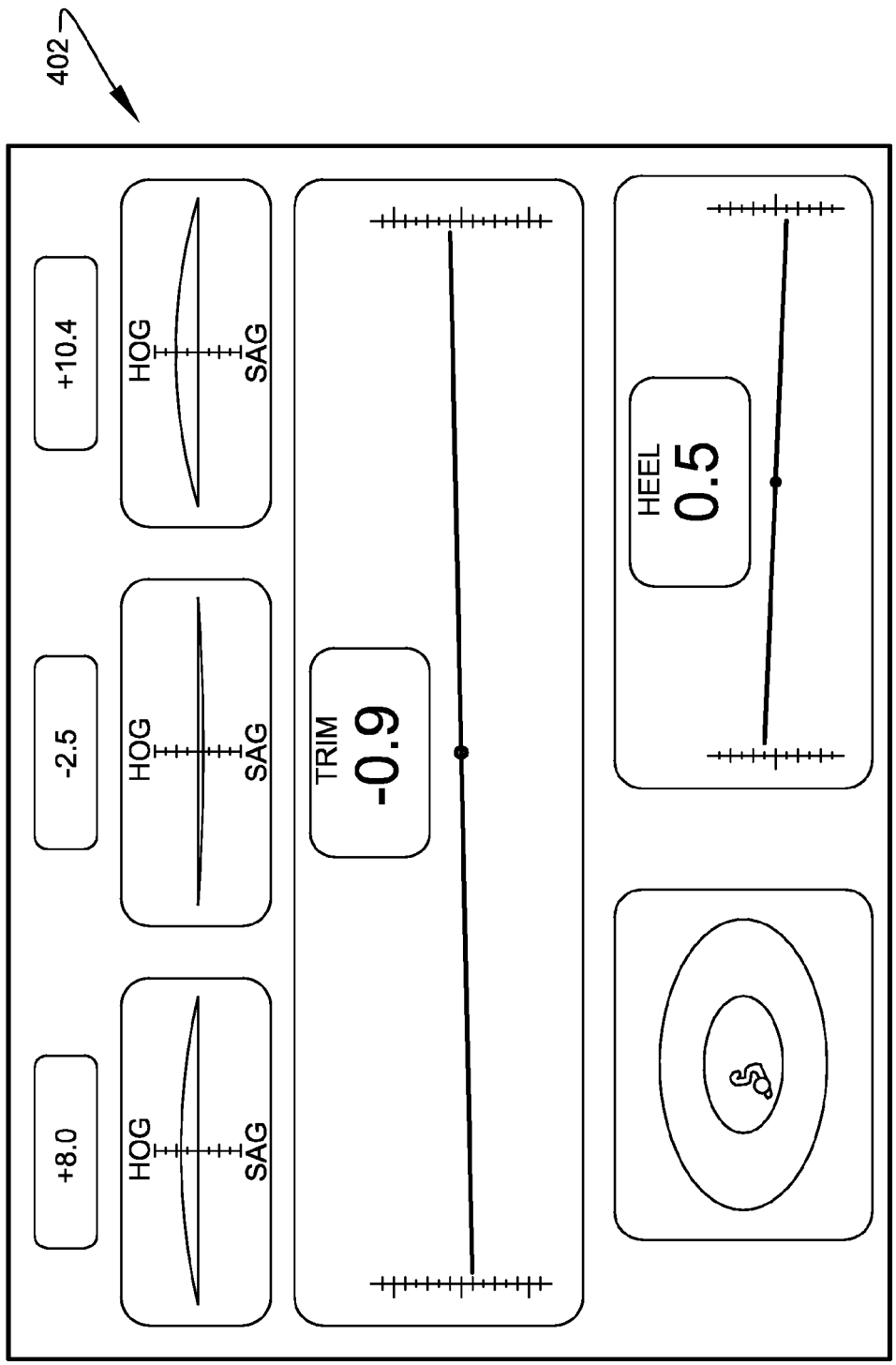
FIG. 12 shows a diagram illustrating a graphical user interface of the Automated Dock Operating Controller, depicting hog, sag, trim, heel, and trend data of the monitored dry dock, according to the preferred embodiment of FIG. 8.

Small hog/sag/trim/heel status window 406 preferably allows the operator to view the same information that is available on the main Hog, Sag, Heel, and Trim graphic overview screen of FIG. 12, in a smaller format, while viewing other screens during the operation of floating dry dock 105.

Menu bar 408 is preferably divided into individual buttons used to access security windows, drafts visual windows, tanks visual windows, valves visual windows, pumps windows, manual control windows, set-point windows, history log windows, prints the active screen function, and a return to the main dock control screen of FIG. 11. The security screen is used to log users in and out of the system. Names and encrypted passwords are stored in a text file located on the hard drive of central data analysis module 114. All "Log-On" and "Log-Off" activities are preferably recorded in a historical event data log.

FIG. 12 shows a diagram illustrating a graphical user interface 402 of ADOC 104, graphically depicting hog, sag, trim, heel, and trend data of the monitored dry dock, according to the preferred embodiment of FIG. 8. This window preferably shows data assisting the operator monitor the status of the dock structures during the raising or lowering of the dock. This window is typically used while the drydock transfer operation is in progress. Hog/Sag Indicators preferably show the current Hog or Sag values for each side of the dock. The color of the text (Green or Red) is preferably used to indicate whether the values are within determined tolerances. A Hog/Sag display show the Hog and Sag (exaggerated for viewing) in a graphical format. Like the value indicators above them, the text preferably changes color based on the alarm status. A draft Indicator preferably indicates the average draft of the dock based on the six draft sensors. A trim display preferably indicates, both graphically and textually, the current trim of the dock. In addition, the angle of trim (degrees) is shown with the setpoint (target) trim that is set prior to a docking event. A heel display preferably displays the heel of the dock in both graphical and textual formats.

Figure 13:
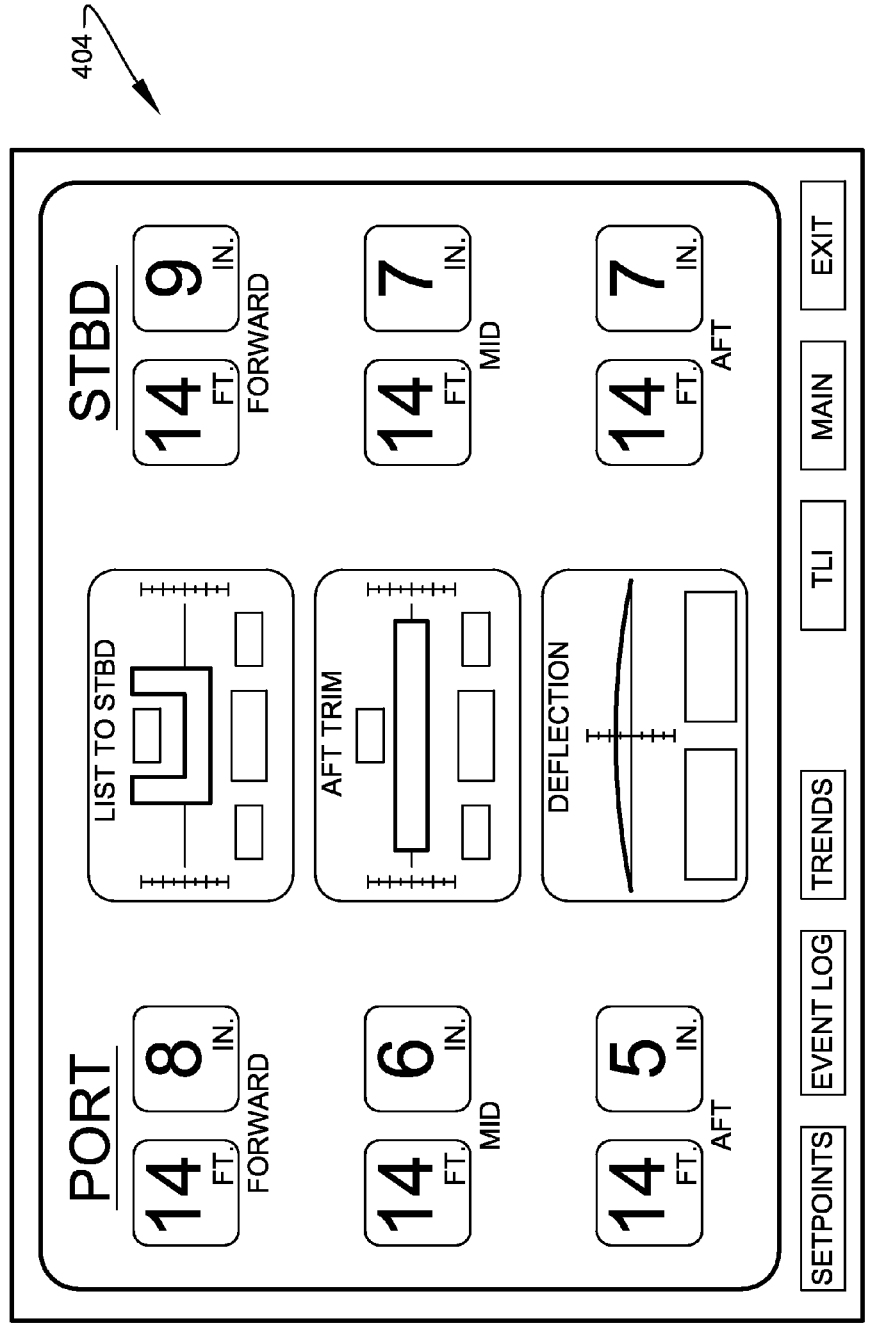
FIG. 13 shows a diagram illustrating a graphical user interface of the Automated Dock Operating Controller, depicting a summary of list, trim, and deflection of the monitored dry dock, according to the preferred embodiment of FIG. 8.
Figure 14:
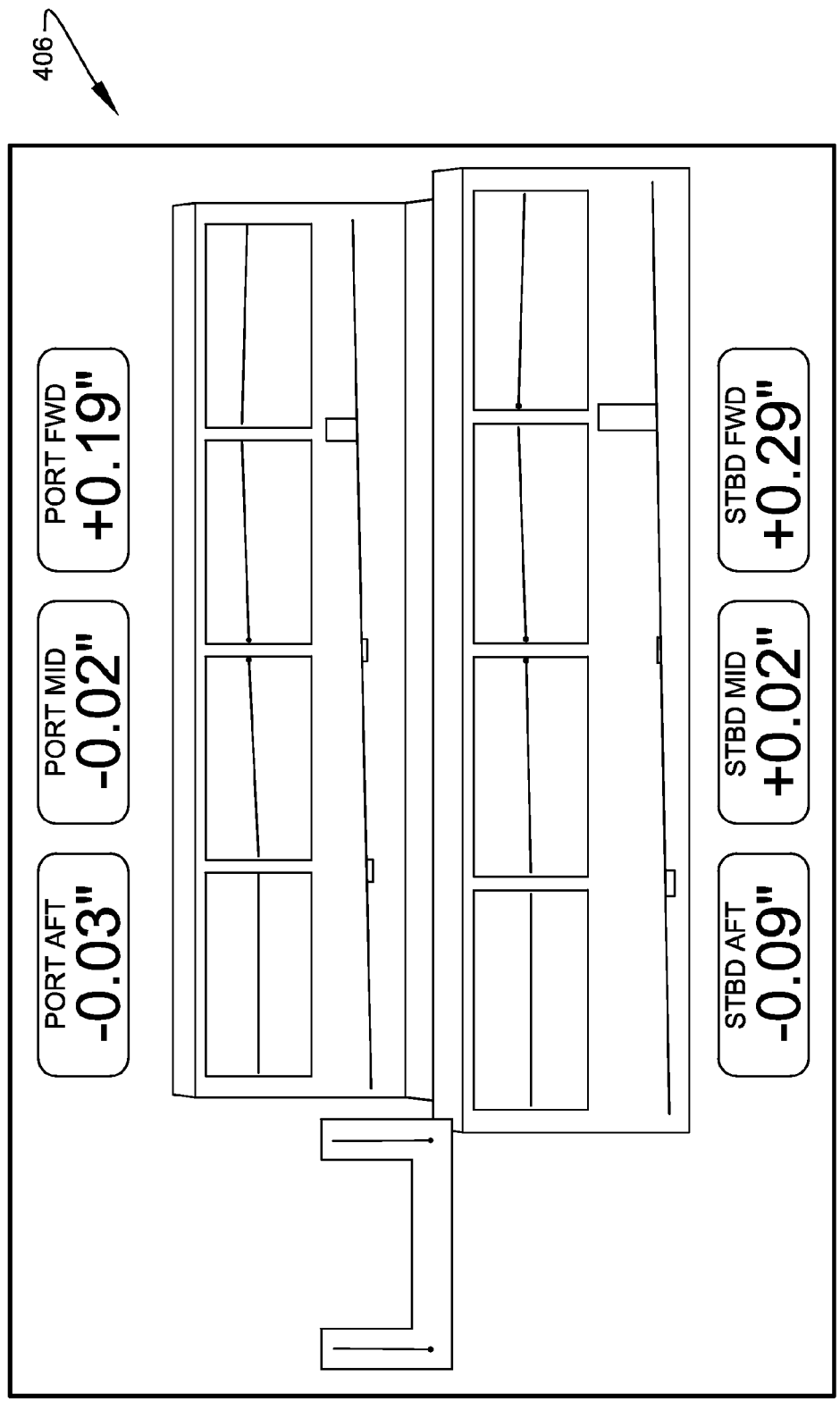
FIG. 14 shows a diagram illustrating a graphical user interface of the Automated Dock Operating Controller, depicting longitudinal and transverse deflection of the monitored dry dock, according to the preferred embodiment of FIG. 8.

FIG. 13 shows a diagram illustrating graphical user interface 404 of ADOC 104, depicting a summary of list, trim, and deflection of the monitored dry dock, according to the preferred embodiment of FIG. 8. Graphical user interface 404 preferably displays the list, trim, and deflection data in both graphical and textual formats, as shown. FIG. 14 shows a diagram illustrating graphical user interface 406 of ADOC 104, depicting longitudinal and transverse deflection of the monitored dry dock, according to the preferred embodiment of FIG. 8. Graphical user interface 406 preferably displays the longitudinal and transverse deflection data in both graphical and textual formats, as shown.

Figure 15:
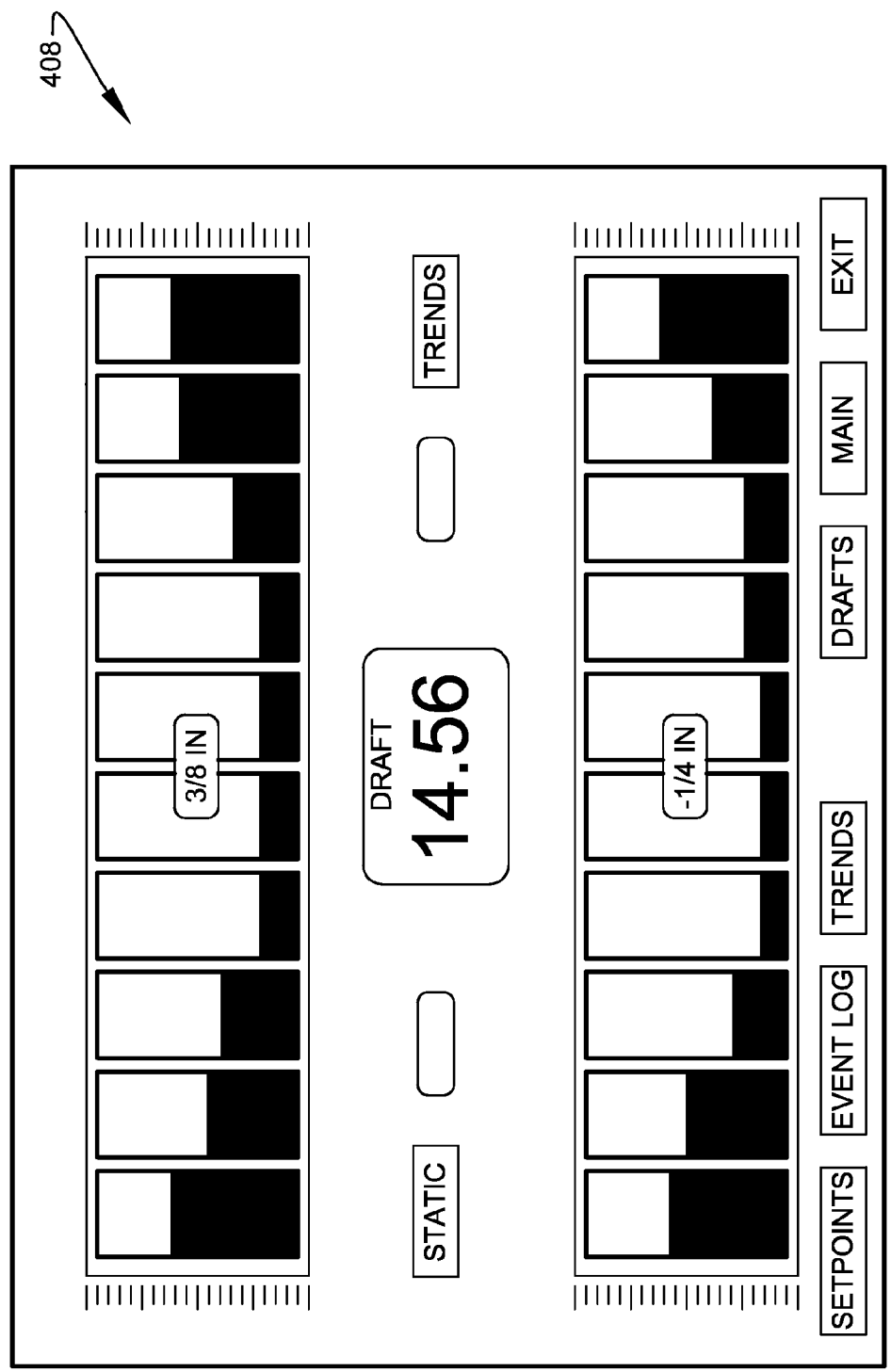
FIG. 15 shows a diagram illustrating a graphical user interface of the Automated Dock Operating Controller, depicting the status of the ballast tanks of the monitored dry dock, according to the preferred embodiment of FIG. 8.

FIG. 15 shows a diagram illustrating graphical user interface 408 of ADOC 104, depicting the status of ballast tanks 109 of the monitored dry dock, according to the preferred embodiment of FIG. 8. This screen gives the operator three pieces of information related to each of the ballast tanks 109 by ballast tank level sensors 136. A "mag. value" is preferably displayed reflecting filtered readings from each of the magnetic level sensors (ballast tank level sensors 136) located inside each of the dry dock ballast tanks A "pressure value" reading preferably displays filtered readings from each of the pressure level sensors located inside each of the dry dock tanks A "working values" reading is also displayed and normally matches the mag. and pressure sensor values. Each ballast tank 109 in the dry dock is preferably represented as a rectangle display, and is labeled to match the dry docks tank layout.

Figure 16:
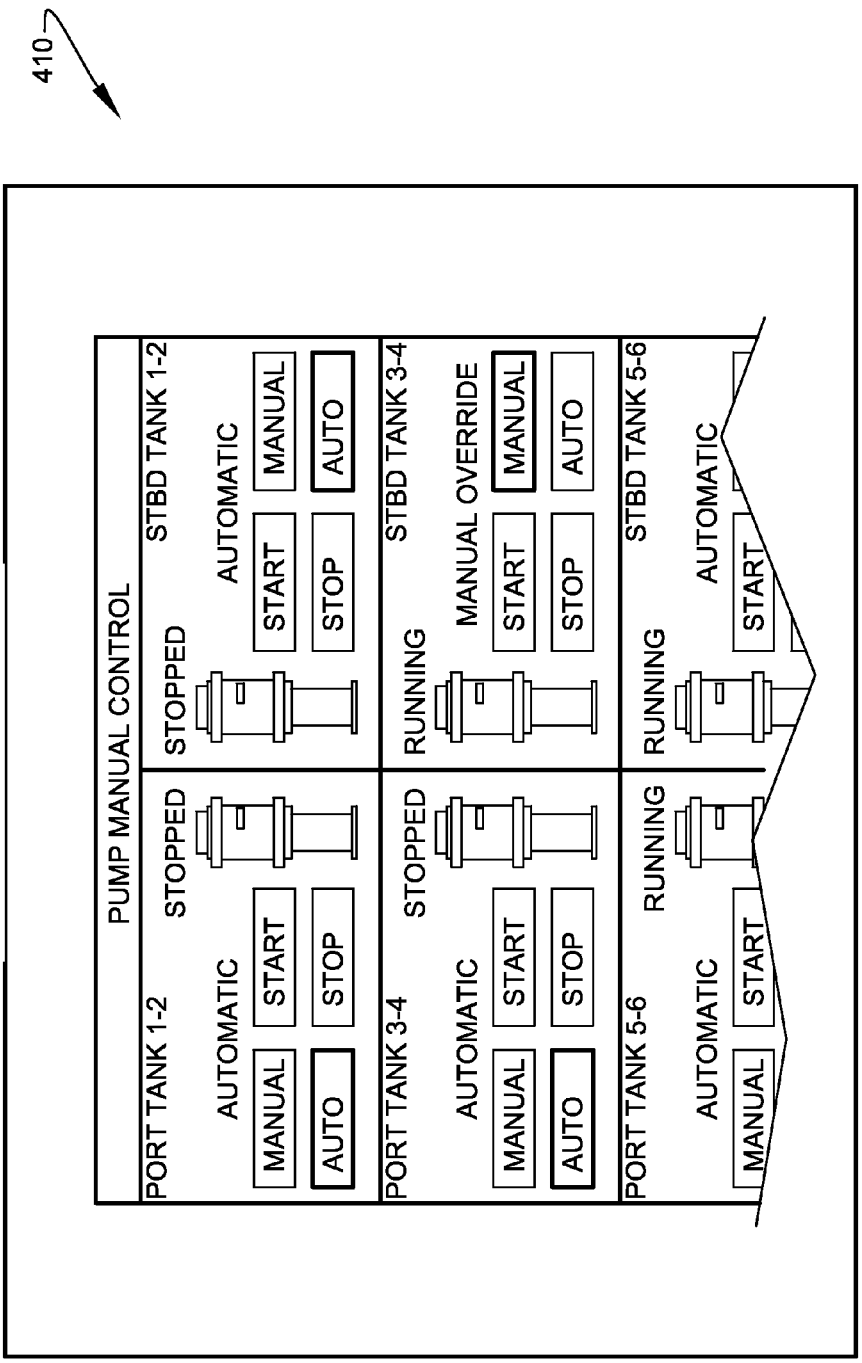
FIG. 16 shows a diagram illustrating a graphical user interface of the Automated Dock Operating Controller, depicting the status of the ballast pumps of the monitored dry dock, according to the preferred embodiment of FIG. 8.
Figure 17:
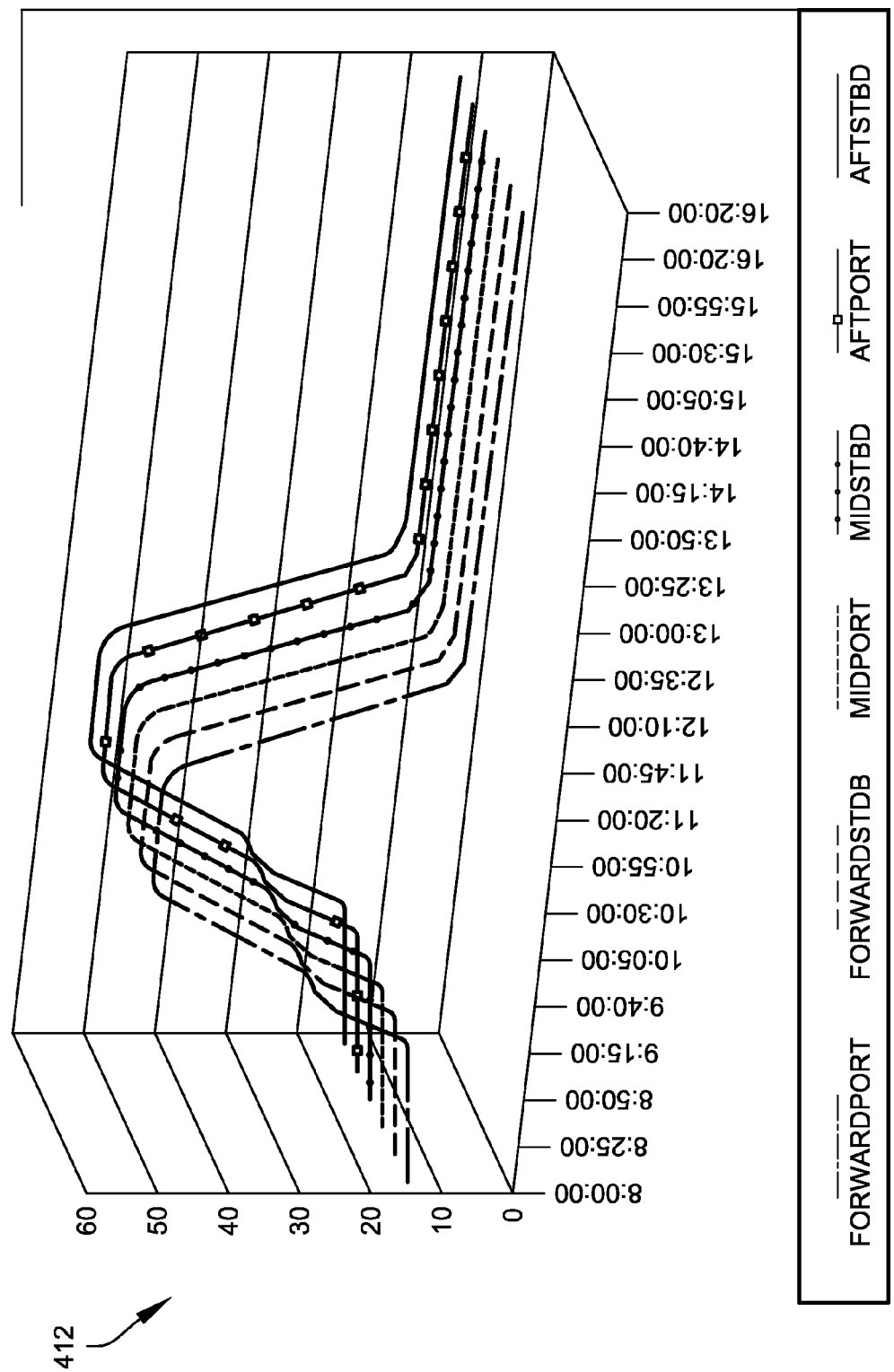
FIG. 17 shows a diagram illustrating a graphical user interface of the Automated Dock Operating Controller, depicting evolution historical draft trends of the monitored dry dock, according to the preferred embodiment of FIG. 8.

FIG. 16 shows a diagram illustrating graphical user interface 410 of ADOC 104, depicting the status of ballast pumps 128 of the monitored dry dock, according to the preferred embodiment of FIG. 8. FIG. 17 shows a diagram illustrating graphical user interface 412 of ADOC 104, depicting evolution historical draft trends of the monitored dry dock, according to the preferred embodiment of FIG. 8. All events in the system are preferably logged to a file on the supervisory computer for later review. Such events preferably include any item that would typically have a specific time-stamp associated with the event. Preferred events for logging include operator log in/out, alarms, and transition specific events. All continuous data is preferably logged to a historical database and can be examined or displayed in the event a transition requires subsequent review (for example, mechanical failures such as pumps, motors, tank level indicators, etc.). Historical information is preferably presented in a graphical format, as shown, which allows for fast retrieval based on the date of the event. Preferably, when pertinent information is found, it can be printed or be transferred electronically. In addition, the information is preferably made available in a simple CSV format for easy import into most spreadsheet and database programs.

Although applicant has described applicant's preferred embodiments of this invention, it will be understood that the broadest scope of this invention includes modifications such as diverse shapes, sizes, and materials. Such scope is limited only by the below claims as read in connection with the above specification. Further, many other advantages of applicant's invention will be apparent to those skilled in the art from the above descriptions and the below claims.

What is claimed is:

1. A retrofitting method, relating to providing enhanced control of deflections of materials in at least one large, dynamically-supported, elongated structure, wherein such structure comprises a first set of sensors spaced along a first length of such structure, such retrofitting method comprising the steps of:
   a) providing a second set of sensors to replace such first set of sensors;
   b) wherein essentially each of such second set of sensors comprises a more direct measurement of inclination than essentially each of such first set of sensors; and
   c) installing such second set of sensors in such structure; and
   d) wherein at least one existing controller for controlling such deflections, usable with such first set of sensors, in essentially unmodified form, is useable with such second set of sensors.

2. The method according to claim 1 wherein such step of installing such second set of sensors in such structure comprises the step of:
   a) decoupling such first set of sensors, providing a measure of elevation, from such at least one existing controller; and
   b) operably coupling such second set of sensors, providing substantially a measure of inclination, with such at least one existing controller.

* * * * *